United States Patent
Haddad et al.

(10) Patent No.: US 11,380,125 B2
(45) Date of Patent: Jul. 5, 2022

(54) UNDER-SCREEN FINGERPRINT READER

(71) Applicants: Waleed Sami Haddad, San Francisco, CA (US); Yuxin Wang, Palatine, IL (US)

(72) Inventors: Waleed Sami Haddad, San Francisco, CA (US); Yuxin Wang, Palatine, IL (US)

(*) Notice: Subject to any disclaimer, the term of this patent is extended or adjusted under 35 U.S.C. 154(b) by 0 days.

(21) Appl. No.: 16/905,208

(22) Filed: Jun. 18, 2020

(65) Prior Publication Data

US 2020/0401781 A1 Dec. 24, 2020

Related U.S. Application Data

(60) Provisional application No. 62/864,982, filed on Jun. 21, 2019.

(51) Int. Cl.
| | |
|---|---|
| *G06K 9/00* | (2022.01) |
| *G06V 40/13* | (2022.01) |
| *G06V 10/141* | (2022.01) |
| *G06V 40/12* | (2022.01) |

(52) U.S. Cl.
CPC ........ *G06V 40/1318* (2022.01); *G06V 10/141* (2022.01); *G06V 40/1359* (2022.01)

(58) Field of Classification Search
CPC .. G06K 9/0004; G06K 9/0008; G06K 9/2027; G06K 9/00026; G06K 9/00087; G06K 9/2036; G01N 21/55; H01L 27/14629; G06F 21/32; G06F 3/0421; G06V 40/318; G06V 10/141; G06V 40/1359
See application file for complete search history.

(56) References Cited

U.S. PATENT DOCUMENTS

| | | |
|---|---|---|
| 6,429,927 B1 | 8/2002 | Borza |
| 8,723,806 B2 | 5/2014 | Kim et al. |
| 8,861,808 B2 | 10/2014 | Kulcke et al. |
| (Continued) | | |

OTHER PUBLICATIONS

Shilov, "Synaptics Unveils Clear ID In-Display Fingerprint Sensor for 18:9, 20:9 Smartphones", Dec. 14, 2017, 5 pages.

(Continued)

*Primary Examiner* — Abdul-Samad A Adediran
(74) *Attorney, Agent, or Firm* — Mueting Raasch Group

(57) ABSTRACT

An optical reader apparatus is configured to detect epidermal ridges of a body part using specular reflection contrast detection. The optical reader apparatus comprises a display comprising a transparent cover and a substrate comprising an array of active pixels. The active pixels serve as an illuminator of the optical reader apparatus. The apparatus also comprises a pinhole array and an optical sensor optically coupled to the display via the pinhole array. The optical sensor comprises an array of photosensors arranged on a substrate. The array of photosensors is configured to detect light reflected via specular reflection by the transparent cover. A processor, coupled to the display and the optical sensor, is configured to control reading of signals from the photosensors and to control illumination of selected active pixels in accordance with a predefined scanning pattern that covers a sensing region of the transparent cover during a body part reading operation.

21 Claims, 25 Drawing Sheets

(56) References Cited

U.S. PATENT DOCUMENTS

| | | |
|---|---|---|
| 10,074,005 B2 | 9/2018 | Chen et al. |
| 10,146,256 B2 | 12/2018 | Sinha et al. |
| 10,198,644 B2 | 2/2019 | Hogan |
| 10,235,556 B2 | 3/2019 | Hogan |
| 2012/0075451 A1 | 3/2012 | Raynor |
| 2013/0051637 A1 | 2/2013 | Kulcke et al. |
| 2016/0070404 A1 | 3/2016 | Kerr et al. |
| 2016/0098152 A1 | 4/2016 | Drumm et al. |
| 2017/0091506 A1* | 3/2017 | Sinha .................. G06F 21/32 |
| 2017/0161543 A1 | 6/2017 | Smith et al. |
| 2017/0169282 A1 | 6/2017 | Hogan |
| 2017/0220844 A1* | 8/2017 | Jones ................... G06F 3/0421 |
| 2017/0357843 A1* | 12/2017 | Chen ................. G06K 9/00087 |
| 2018/0225498 A1* | 8/2018 | Setlak ................. G01N 21/55 |
| 2018/0357462 A1* | 12/2018 | Mackey ............ G06K 9/00026 |
| 2019/0095671 A1* | 3/2019 | Yeke Yazdandoost ...................... G06K 9/2036 |
| 2019/0220121 A1 | 7/2019 | Kim et al. |
| 2019/0362120 A1* | 11/2019 | Yeke Yazdandoost ...................... G06K 9/0004 |

OTHER PUBLICATIONS

Office action dated Jun. 24, 2020 from U.S. Appl. No. 16/380,402, 22 pages.

* cited by examiner

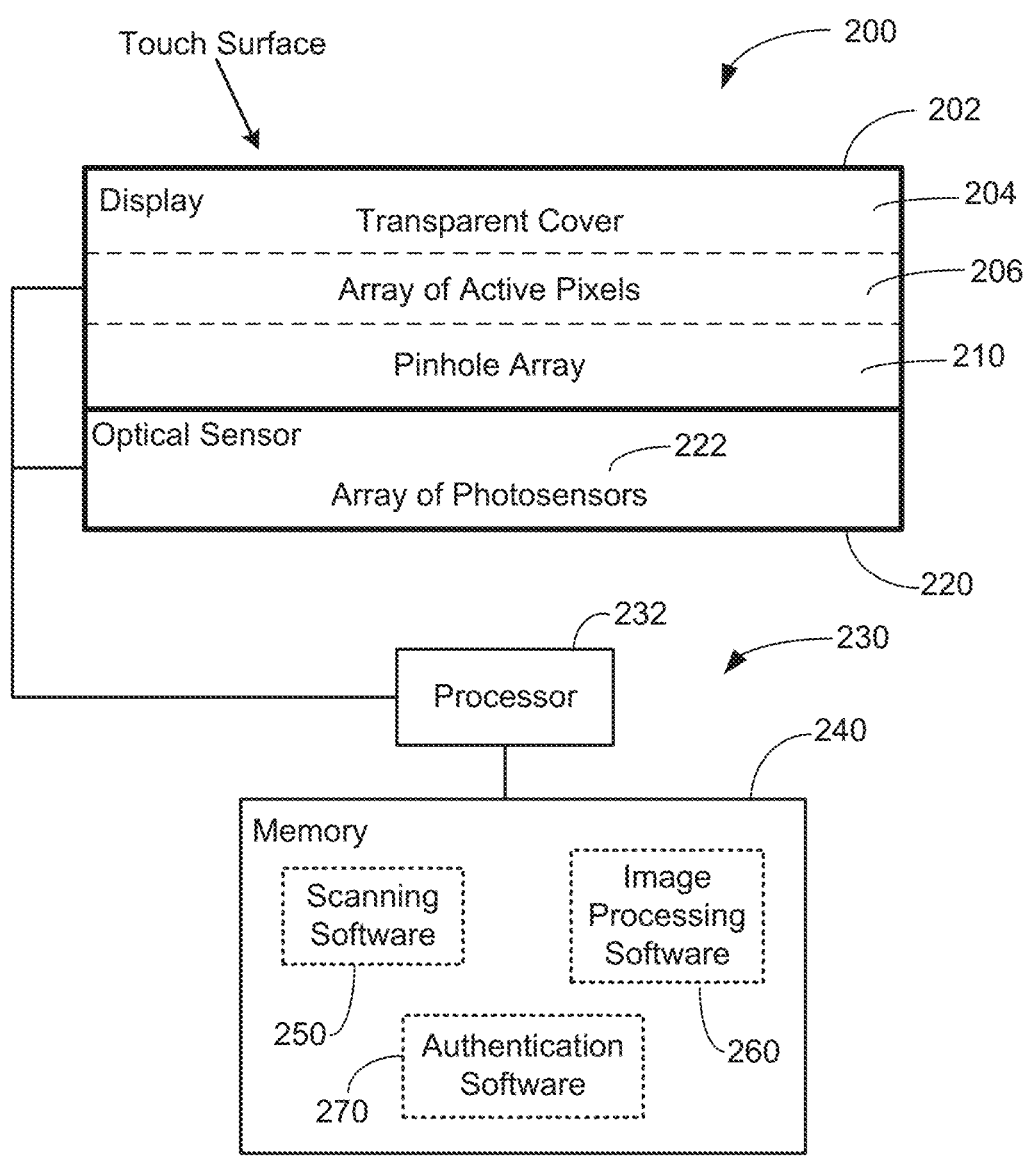

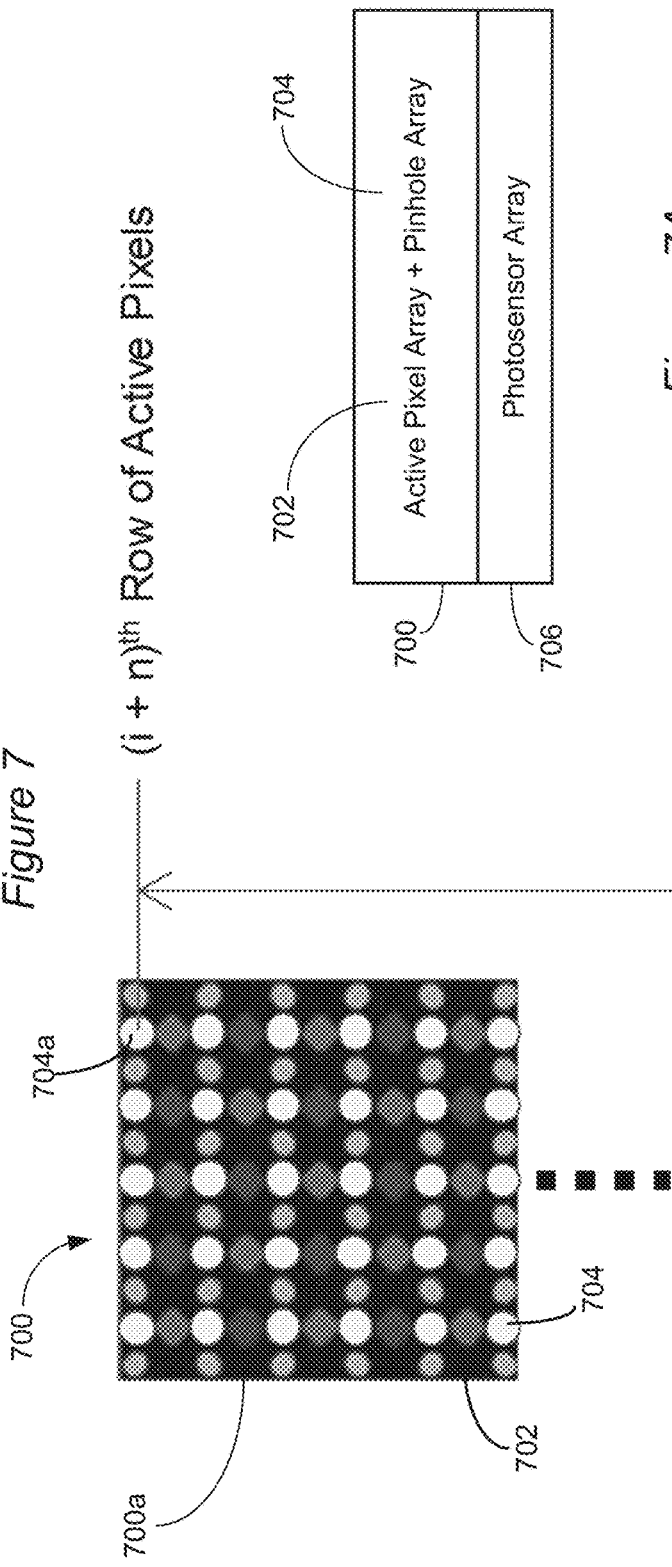
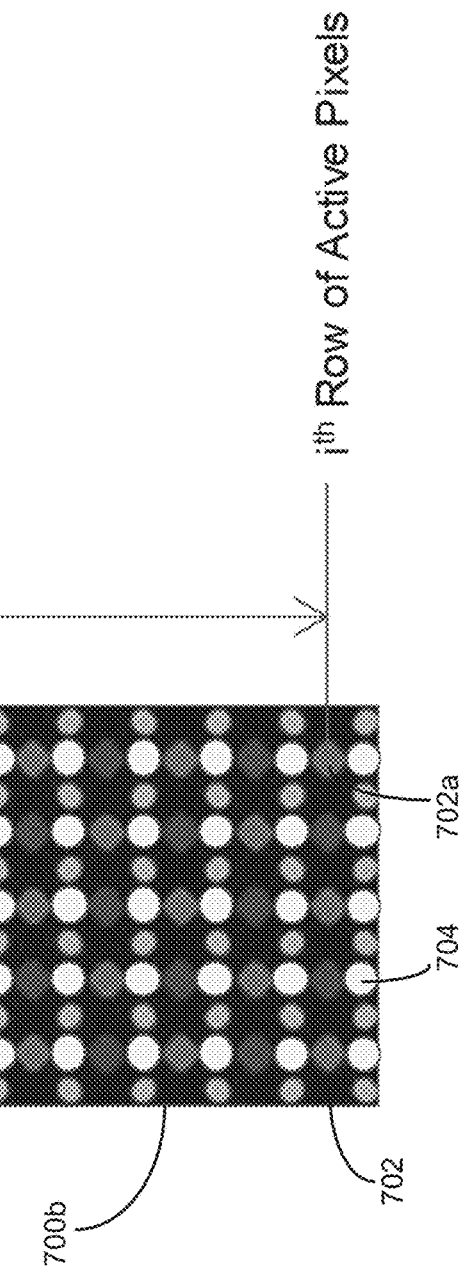
*Figure 7*
*Figure 7A*

*Figure 20*

Summary

| | Conventional FPS | Bound under-display FPS | Disclosed Technology |
|---|---|---|---|
| Contrast | Excellent | Poor | Excellent |
| Capture Area | ~ 10 mm x 10 mm | < 5 mm x 5 mm | Full display possible |
| Appearance | N/A | Visible under bright light | Invisible from front side |
| Image Processing | N/A | Extensive. Difficult to execute in trust zone. | Simple processing. |
| Security | N/A | Low-contrast images requires higher FAR. Vulnerability in image processing chain. | Safe execution in trust zone. |

UNDER-SCREEN FINGERPRINT READER

RELATED PATENT DOCUMENTS

This application claims the benefit of Provisional Patent Application Ser. No. 62/864,982 filed on Jun. 21, 2019, to which priority is claimed pursuant to 35 U.S.C. § 119(e) and which is hereby incorporated herein by reference.

SUMMARY

Embodiments of the disclosure are directed to an optical reader apparatus configured to detect epidermal ridges of a body part using specular reflection contrast detection. The optical reader apparatus comprises a display comprising a transparent cover and a substrate comprising an array of active pixels. The active pixels serve as an illuminator of the optical reader apparatus. The apparatus also comprises a pinhole array and an optical sensor optically coupled to the display via the pinhole array. The optical sensor comprises an array of photosensors arranged on a substrate. The array of photosensors is configured to detect light reflected via specular reflection by the transparent cover. A processor, coupled to the display and the optical sensor, is configured to control reading of signals from the photosensors and to control illumination of selected active pixels in accordance with a predefined scanning pattern that covers a sensing region of the transparent cover during a body part reading operation.

Embodiments of the disclosure are directed to an optical reader apparatus configured to detect epidermal ridges of a body part using specular reflection contrast detection. The apparatus comprises a display comprising a transparent cover and a substrate comprising an array of active pixels. The active pixels serve as an illuminator of the apparatus. The apparatus also comprises a pinhole array and an optical sensor optically coupled to the display via the pinhole array. The optical sensor comprises an array of photosensors arranged on a substrate in an offset relationship with respect to the array of active pixels. The array of photosensors is configured to detect light reflected via specular reflection by the transparent cover. A processor, coupled to the display and the optical sensor, is configured to control illumination of selected active pixels and reading of signals from the photosensors in accordance with a predefined scanning pattern that covers a sensing region of the transparent cover during a body part reading operation.

The above summary is not intended to describe each disclosed embodiment or every implementation of the present disclosure. The figures and the detailed description below more particularly exemplify illustrative embodiments.

BRIEF DESCRIPTION OF THE DRAWINGS

FIG. 2 illustrates an optical fingerprint reader apparatus configured for use with or within an opaque display in accordance with various embodiments;

FIG. 7 illustrates an automatic scanning pattern that can be implemented by a processor coupled to an optical fingerprint reader in accordance with various embodiments;

FIG. 20 is a table that summarizes several advantages of an under-display specular reflection fingerprint reader in accordance with various embodiments over conventional under-display fingerprint readers.

Figure 1:
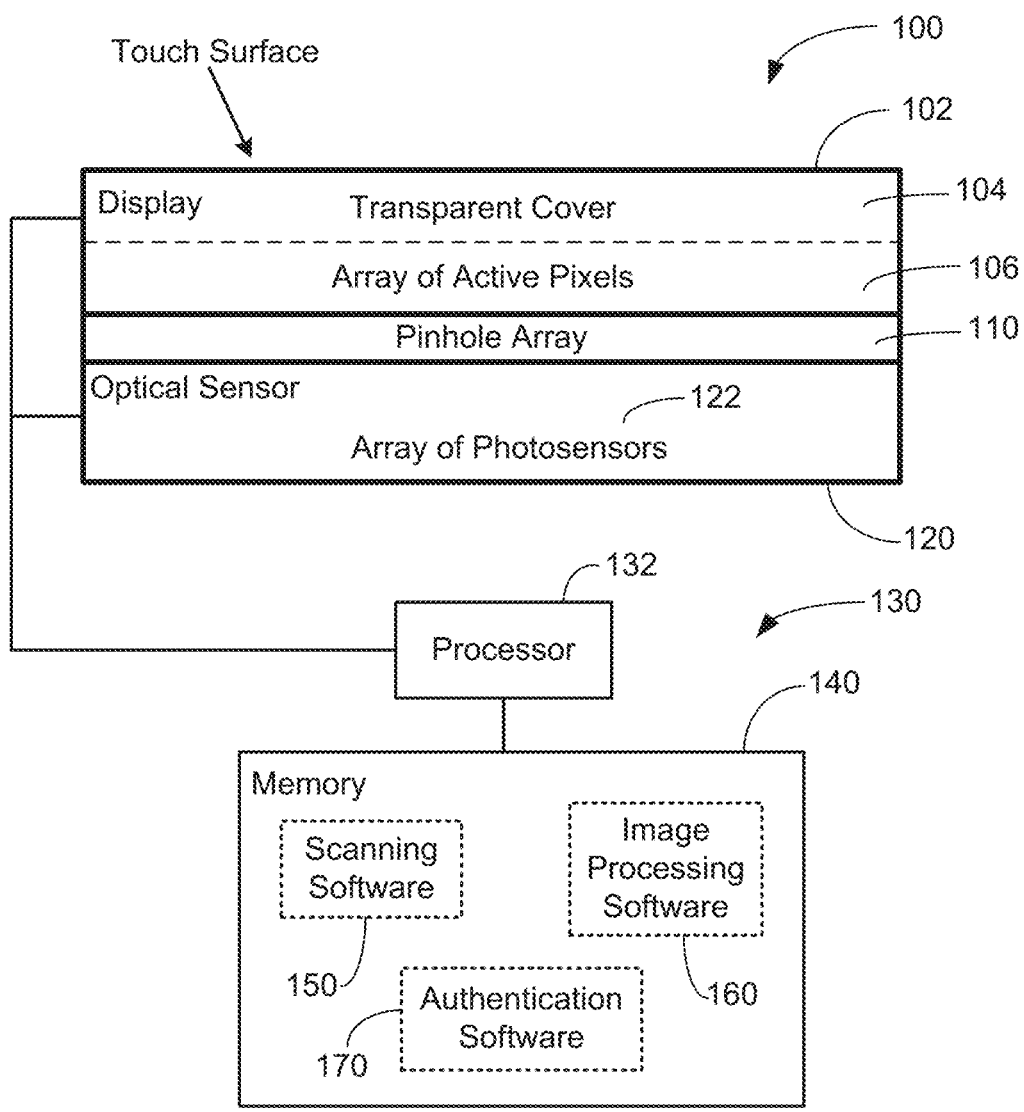
FIG. 1 illustrates an optical fingerprint reader apparatus configured for use with or within a transparent display in accordance with various embodiments.

The figures are not necessarily to scale, and some are intentionally not to scale for purposes of illustration. Like numbers used in the figures refer to like components. However, it will be understood that the use of a number to refer to a component in a given figure is not intended to limit the component in another figure labeled with the same number.

DESCRIPTION

Embodiments of the disclosure are directed to a fingerprint reader configured to exploit the principle of specular reflection for its primary contrast mechanism. Although reference is made generally herein to an optical sensing device configured to read fingerprints, it is to be understood that optical sensing devices disclosed herein can be configured to read any ridges (e.g., friction or epidermal ridges) of the epidermis. For example, optical sensing devices disclosed herein can be configured to read friction ridges or raised portions of the epidermis on the digits (fingers or toes), the palm of the hand (or hands), and/or the sole of the foot (or feet). In this regard, the term fingerprint reader as used herein is interchangeable with the terms epidermal ridge reader and friction ridge reader.

A fingerprint reader of the present disclosure advantageously exploits the active pixels of a display to which the fingerprint reader is optically coupled as an illuminator for the fingerprint reader. For example, the fingerprint reader uses the display's array of active pixels (e.g., LEDs) for illumination during a fingerprint reading operation. The display can comprise a touch screen or a non-touch-sensitive screen. An optical sensor of the fingerprint reader includes an array of photosensors for detecting light reflected from the display's transparent cover (e.g., glass or plastic). The reflected light detected by the array of photosensors varies in intensity according to the principle of specular reflection. The variations in light intensity detected by the photosensors correspond to variations in skin features of a finger (e.g., ridges and valleys) when the finger contacts the transparent cover of the display during a fingerprint reading operation. An image of a person's fingerprint is generated by the fingerprint reader using signals read from the photosensors. A fingerprint reader of the present disclosure is ideal for, but not limited to, integration into a mobile phone (e.g., a smartphone), tablet or phablet.

A unique scanning methodology is implemented by the fingerprint reader which turns on only certain active pixels within a finger sensing region of the display, while other active pixels within the finger sensing region remain off. This subset of illuminated active pixels defines a scanning pattern which is shifted in a step-wise manner during a fingerprint reading operation until all of the active pixels within the finger sensing region have been illuminated during the fingerprint reading operation. In some embodiments, the scanning pattern can have a shape or configuration defined by the subset of illuminated active pixels that remains consistent (e.g., has a static shape), and this static configuration is maintained as it is shifted in a step-wise manner until all of the active pixels within the finger sensing region have been illuminated during the fingerprint reading operation. In other embodiments, the scanning pattern can have a shape or configuration defined by the subset of illuminated active pixels that varies (e.g., has a dynamic shape), and this varying configuration is shifted in a step-wise manner until all of the active pixels within the finger sensing region have been illuminated during the fingerprint reading operation.

In some embodiments, the fingerprint reader is configured to provide a single finger sensing region for reading a fingerprint from a single finger. In other embodiments, the fingerprint reader is configured to provide a multiplicity of finger sensing regions for reading sequentially or concurrently a fingerprint from a multiplicity of fingers. The finger sensing region or regions can be fixed locations of the display. In the case of a touch sensitive display, the finger sensing region or regions can be dynamically determined based on a location of a touch applied to the display. In some embodiments, the entire display can define a finger sensing region or regions. In other embodiments, a specified portion of the display can define a finger sensing region or regions.

During the scanning operation, signals from the photosensors are read and stored. In some embodiments, signals are read and/or processed from only certain photosensors that have a specified positional relationship with respect to the subset of illuminated active pixels of the scanning pattern. For example, scanning software of the fingerprint reader can drive the display to turn on only certain active pixels (such as, but not limited to, a single row of active pixels), and read signals from an associated subset of photosensors of the photosensor array (such as, but not limited to, a single row of photosensors), then shifting the scanning pattern of active pixels and associated photosensors step-wise, to cover the entire finger sensing region. The signals read from the photosensors during each scan (e.g., resulting in frames of photosensor data) are combined by image processing software of the fingerprint reader to produce an image of a fingerprint. Authentication software can be implemented by the fingerprint reader or an electronic device physically and/or communicatively coupled to the fingerprint reader. Using the reproduced fingerprint image produced by the image processing software, the identity of a person whose fingerprint is being processed can be authenticated.

FIG. 1 illustrates an optical fingerprint reader apparatus in accordance with various embodiments. The optical fingerprint reader apparatus 100 shown in FIG. 1 includes a display 102 comprising a transparent cover 102 and an array of active pixels 106 disposed on a substrate. In some embodiments, the substrate of the active pixels 106 is a transparent substrate and conductive traces that connect to the active pixels 106 are also transparent. In other embodiments, the conductive traces can be opaque, and the opaque traces can be arranged on the transparent substrate to form window regions that allow light to pass therethrough. The active pixels 106 serve as an illuminator of the optical fingerprint reader apparatus 100. Using the active pixels 106 of the display 102 as an illuminator advantageously eliminates the need for a separate illumination/light source for implementing a fingerprint reading operation. In some embodiments, the display 102 is configured as a touch screen (e.g., capacitive, force, surface acoustic wave, infrared, or resistive touch screen), while in other embodiments the display 102 is configured as a non-touch-sensitive screen.

The optical fingerprint reader apparatus 100 also includes a pinhole array 110 and an optical sensor 120. The optical sensor 120 comprises an array of photosensors 122 and is optically coupled to the display 102 via the pinhole array 110. In some embodiments, the pinhole array 110 need not be included. Light generated by the active pixels 106 is reflected via specular reflection by the transparent cover 102, passes through the transparent active pixel substrate, and is communicated to the optical sensor 120 via the pinhole array 110. The pinhole array 110 is configured to collimate the reflected light rays to preferentially select light rays at an angle greater than or equal to the critical angle, details of which are provided hereinbelow.

In some embodiments, the display 102 and the optical sensor 120 are manufactured as physically distinct devices, which advantageously allows the optical sensor 122 to be used with a variety of different types of displays 102. The pinhole array 110 can also be manufactured as a structure physically distinct from the display 102, allowing the pinhole array 110 and the optical sensor 122 to be used with a variety of different types of displays 102. In some embodiments, the pinhole array 110 is affixed to an exterior surface of the display 102. In other embodiments, the pinhole array 110 is a component integral to the optical sensor 120 (e.g., affixed to an internal or external surface of the optical sensor 120 adjacent to the exterior surface of the display 102). In further embodiments, the optical sensor 120 can exclude the pinhole array 110 altogether.

A processing arrangement 130 is communicatively coupled to the optical fingerprint reader apparatus 100. In some embodiments, the processing arrangement 130 defines components of the fingerprint reader apparatus 100. For example, the processing arrangement 130 can define components of the optical sensor 120 or the display 104. In other embodiments, the processing arrangement 130 defines components of an electronic device (e.g., a smartphone, tablet, laptop, etc.) which incorporates the optical fingerprint reader apparatus 100. The processing arrangement 130 includes a processor 132 operably coupled to the display 102 and the optical sensor 120. The processor 132 is coupled to memory 140, which is shown to include various software modules. These software modules comprise computer-readable code or instructions which can be executed by the processor 132 to carry out various specified functions.

In general, the active pixel scanning, fingerprint image processing, and fingerprint authentication processing techniques described herein may be implemented in hardware, software, firmware, or any combination thereof. Various features described or illustrated herein as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

For example, the memory 140 can store scanning software 150 which can be implemented by the processor 132 to perform scanning of active pixels of the display 102 in accordance with a predetermined scanning pattern. When implementing the scanning software 150, the processor 132 is configured to control reading of signals from the array of photosensors 122 and to control illumination of selected active pixels 106 of the display 102 in accordance with the predefined scanning pattern that covers a finger sensing region of the transparent cover 102 during a fingerprint reading operation. When implementing the image processing software 160, the processor 132 is configured to generate a fingerprint image by combining individual frames of photosensor data obtained during respective scans of the finger sensing region of the display 102 in accordance with the predefined scanning pattern. When implementing the authentication software 170, the processor 132 is configured to authenticate the identity of the user of the fingerprint reader apparatus 100 using the fingerprint image generated by the processor 132.

The processor 132 can be representative of any type of logic device, integrated circuit device, or combination of one or more logic and/or IC devices (e.g., multi-core processors, integrated or discrete logic circuitry), other digital logic circuitry (e.g., ASICs, FPGAs, ASSPs), memory (e.g., Flash, RAM, ROM, etc.), and software/firmware configured to implement the processes described herein. If implemented in hardware, this disclosure may be directed to an apparatus such a processor or an integrated circuit device, such as an integrated circuit chip or chipset. Alternatively or additionally, if implemented in software or firmware, the techniques disclosed herein may be realized at least in part by a computer-readable data storage medium (e.g., ROM, RAM, SDRAM, NVRAM, EEPROM, FLASH) comprising instructions that, when executed, cause the processor 132 to perform one or more of the methods described herein. For example, the computer-readable data storage medium may store such instructions for execution by the processor 132. Accordingly, the term "processor," as used herein may refer to any of the foregoing structures or any other structure suitable for implementation of the techniques described herein. In addition, in some aspects, functionality described in this disclosure may be provided within software modules or hardware modules. These and other aspects are within the scope of the claims appended hereto.

FIG. 2 illustrates an optical fingerprint reader apparatus in accordance with various embodiments. The optical fingerprint reader apparatus 200 shown in FIG. 2 includes a display 202 comprising a transparent cover 202 and an array of active pixels 206 disposed on a substrate. In the embodiment shown in FIG. 2, the active pixel substrate is opaque, and is fabricated to include apertures (e.g., pinholes) in the opaque substrate that define a pinhole array 210. As such, the pinhole array 210 shown in FIG. 2 is integrally incorporated in the display 202. The conductive traces that connect to the active pixels 206 can be opaque or, if desired, transparent. If opaque, the conductive traces that connect to the active pixels 206 are routed around the apertures in the opaque substrate. The active pixels 206 serve as an illuminator of the optical fingerprint reader apparatus 200. In some embodiments, the display 202 is configured as a touch screen (e.g., capacitive, force, surface acoustic wave, infrared, or resistive touch screen), while in other embodiments the display 202 is configured as a non-touch-sensitive screen.

The optical sensor 220 comprises an array of photosensors 222 and is optically coupled to the display 202 via the pinhole array 210. In some embodiments, the display 202 and the optical sensor 220 are manufactured as physically distinct devices, which advantageously allows the optical sensor 222 to be used with a variety of different types of displays 202 that incorporate an integral pinhole array 210.

A processing arrangement 230 is communicatively coupled to the optical fingerprint reader apparatus 200. In some embodiments, the processing arrangement 230 defines components of the fingerprint reader apparatus 200. For example, the processing arrangement 230 can define components of the optical sensor 220 or the display 202. In some embodiments, the processing arrangement 230 defines components of an electronic device (e.g., a smartphone, tablet, laptop, etc.) which incorporates the optical fingerprint reader apparatus 200. The processing arrangement 230 includes a processor 232 operably coupled to the display 202 and the optical sensor 220. The processor 232 is coupled to memory 240, which is shown to include various software modules (scanning software 250, image processing software 260, authentication software 270). These software modules comprise computer-readable code or instructions which can be executed by the processor 232 to carry out various specified functions, including those previously described with respect to the embodiment shown in FIG. 1. The processing arrangement 230 can be implemented to include hardware, software, and/or firmware equivalent or similar to that described with respect to the embodiment shown in FIG. 1.

In some embodiments, some or all of the components (hardware and/or software) of the processing arrangement 130, 230 shown in FIGS. 1 and 2 can be implemented in a trusted execution environment (e.g., a trusted zone). The trusted execution environment for some or all of the processing arrangement components defines an isolated execution environment that provides security features such as isolated execution and integrity of applications executing within the trusted execution environment, along with confidentiality of their assets. The trusted execution environment can be implemented as an isolated environment (e.g., a dedicated processor and memory) that runs in parallel with the operating system of the electronic device into which the optical fingerprint reader apparatus 100, 200 is incorporated.

FIGS. 3A-6 illustrate embodiments of optical fingerprint reader apparatuses that exploit a Frustrated Total Internal Reflection (FTIR) contrast detection mechanism in accordance with various embodiments. The figures and associated description provided in the text below illustrate embodiments of optical fingerprint reader apparatuses that exploit a specular reflection contrast detection mechanism in accordance with various embodiments. It is understood that an optical fingerprint reader apparatus that exploits a specular reflection contrast detection mechanism can incorporate any of the structures and functionality described with respect to the FTIR contrast detection embodiments shown in FIGS. 3A-6. The embodiments shown in FIGS. 11-20 are particularly directed to optical fingerprint reader apparatuses that exploit a specular reflection contrast detection mechanism in accordance with various embodiments. The embodiments shown in FIGS. 11-20 share many of the structural and functional features of the FTIR embodiments shown in FIGS. 3A-6, with some features differing from the FTIR embodiments as noted herein.

For example, FTIR and specular reflection contrast detection embodiments provide for a spacing, D or d, between an activated pixel and its corresponding pinhole, which helps to limit the sensing of light from a specific activated pixel to a specified photosensor. In addition, it is also possible to electronically activate only the specific photosensors that correspond to each activated illuminator pixels. This spacing, D (in FIGS. 3A-6) or d (in FIGS. 15A-17), is related to the thickness, h, and refractive index, n, of the display, and any of other material layers defined between the array of active pixels and the contact surface of the transparent cover of the display where a finger, hand or other body part is placed. Given a typical refractive index, n, of approximately 1.5 for the material layers between the active pixels and the contact surface, in the FTIR embodiments shown in FIGS. 3A-6, the spacing, D, is generally shown as a value greater than or equal to 2 h (e.g., D≥2 h). In the specular reflection embodiments shown in FIGS. 15A-17, the spacing, d, is generally shown as a value less than 2 h (e.g., d<2 h). It is understood that the value of D or d is based on the particular reflection angle for a particular fingerprint reader design, and that the value of h, 2 h, D, d, n (refractive index), or any other dimensions or parameters will vary depending on the particular design of the display and optical sensor.

Figure 3A:
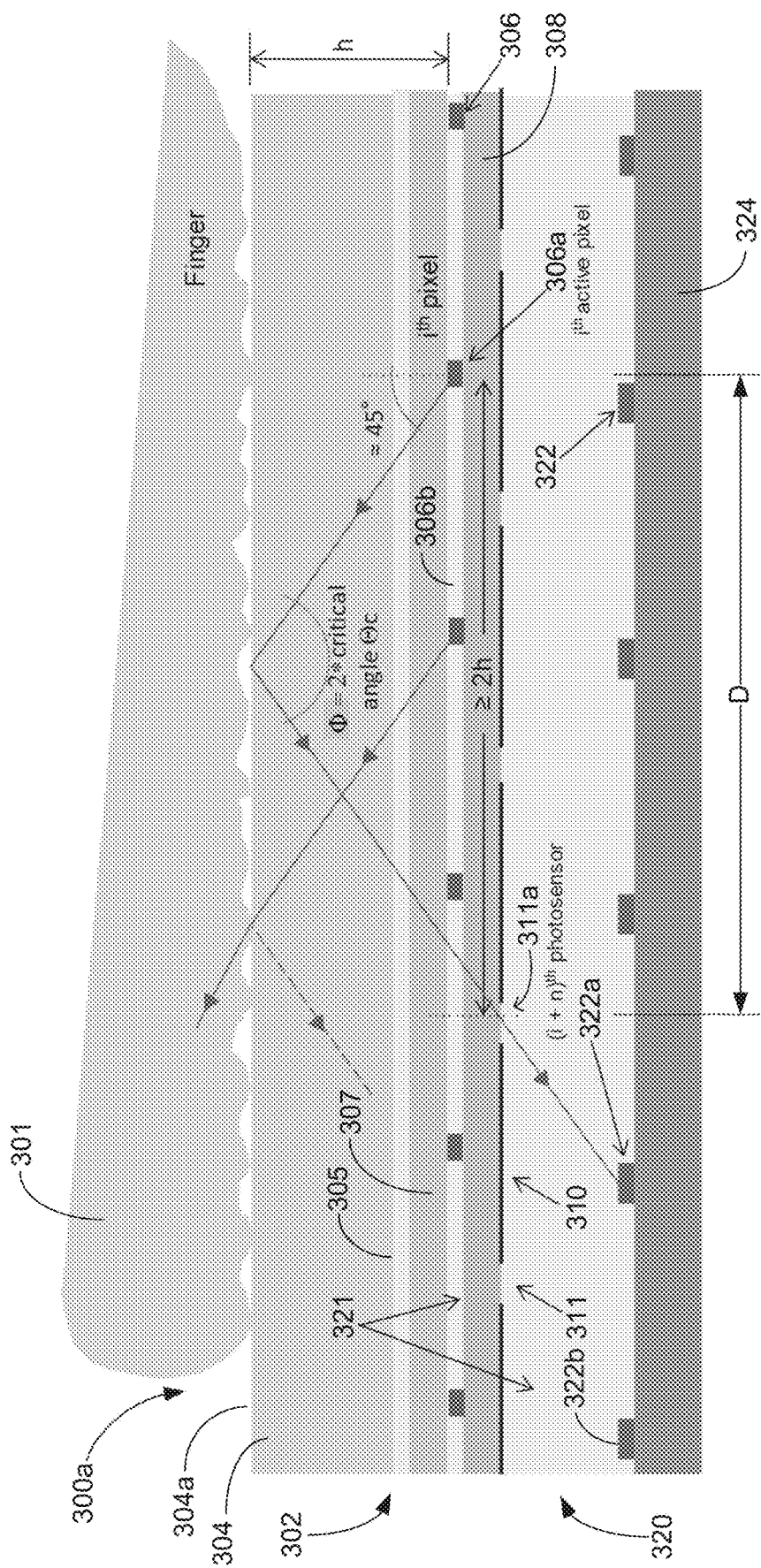
FIG. 3A shows an optical fingerprint reader apparatus configured for use with or within a transparent display in accordance with various embodiments.

FIG. 3A shows an optical fingerprint reader apparatus implemented in accordance with various embodiments. The optical fingerprint reader apparatus 300a includes a display 302 optically coupled to an optical sensor 320 via a pinhole array 310. In the embodiment shown in FIG. 3A (and other figures), the display 302 is implemented as an Organic Light Emitting Diode (OLED) display, such as an active-matrix OLED, referred to as an AMOLED. In some embodiments, the display 302 shown in FIG. 3A (and in other figures) can be implemented as a low-temperature polycrystalline silicon (LTPS) OLED display screen, which utilizes an LTPS TFT (Thin-Film Transistor) backplane. In other embodiments, the display 302 shown in FIG. 3A (and in other figures) can be implemented as a low-temperature polycrystalline oxide (LTPO) OLED display screen, which utilizes an LTPO TFT backplane. It is understood that the display 302 shown in FIG. 3A (and other figures) can be implemented according to other technologies (e.g., other LED technologies) that utilize an array of active or self-illuminating pixels as the illumination source, rather than a separate backlight (e.g., an LCD backlight).

Display 302 shown in FIG. 3A includes a transparent cover 304 (e.g., cover glass or plastic) which defines a contact surface 304a of the optical fingerprint reader apparatus 300a to which a finger 301 can be applied. The transparent cover 304 has a specified refractive index, such as about 1.5 (e.g., n≈1.5). The transparent cover 304 can have a thickness of about 0.5 mm (e.g., cover glass plus adhesive). The transparent cover 304 is in contact with a polarizer 305, which can have a thickness of about 50 μm. Active pixels 306, preferably arranged as an array of active pixels 306, are disposed on TFT glass 308. The TFT glass 308 serves as a transparent substrate upon which the active pixels 306 are disposed. Encapsulating glass 307 is disposed between the polarizer 305/transparent cover 304 and the array of active pixels 306. It is understood that the component layers of the display 302 can vary from those shown in FIG. 3A (and other figures), and that the particular component layers of the display 302 shown in FIG. 3A (and other figures) represent non-limiting examples of constituent elements of a display that can be optically coupled to the optical sensor 320 to define an optical fingerprint reader apparatus of the present disclosure. For example, the display 302 may exclude the polarizer 305.

A dielectric filling material 321 is disposed between adjacent active pixels 306 and fills the void between the encapsulating glass 307 and the TFT glass 308. The dielectric filling material 321 has a refractive index equivalent to or about the same as that of the transparent cover 304 (e.g., n≈1.5). In general, it is desirable that the various transparent layers and materials of the display 304 have about the same refractive index to minimize internal reflections at dielectric interfaces. The encapsulating glass 307 and the TFT glass 308 can have a thickness of about 100 μm. The total thickness, h, of the display 304 defined between the array of active pixels 306 and a contact surface 304a of the transparent cover 304 is about 550 μm.

The optical sensor 320 includes an array of photosensors 322 disposed on a substrate 324. The photosensors 322 can take the form of any sensor which is sensitive to light. For example, the array of photosensors 322 can be implemented as an array of photodiodes. In other embodiments, the array of photosensors 322 can be implemented as any other indexable, readable array of photosensitive pixels, such as a CMOS sensor or a CCD sensor. The optical sensor 320 includes dielectric filling material 321 disposed between adjacent photosensors 322 and fills the void between the TFT glass 308 and the substrate 324. The dielectric filling material 321 of the optical sensor 320 has a refractive index equivalent to or about the same as that of transparent material of the display 304 (e.g., n≈1.5). It is desirable that the refractive index of transparent layers and material of the display 304 and the optical sensor 320 be equivalent or about the same, which serves to minimize internal reflections at dielectric interfaces. It is noted that the dielectric filling material 321 can be an optical cement, an optical adhesive, air or other refractive index matching material.

The pinhole array 310 shown in FIG. 3A is affixed (e.g., via an adhesive) to the surface of the TFT glass 308 facing the array of photosensors 322. The pinhole array 310 includes an array of pinholes 311, each of which is filled with dielectric filling material 321. The pinhole array 310 can be a pinhole mask comprising black chrome deposited on a substrate with an array of holes provided therethrough. The pinhole mask can be adhesively applied directly to the surface of the TFT glass 308 that faces the array of photosensors 322.

The optical fingerprint reader apparatus 300a shown in FIG. 3A (and other figures) relies on FTIR for its primary contrast mechanism. In this case, the FTIR is dependent on the critical angle, $\Theta_c$, at the interface between the contact surface 304a of the transparent cover 304 of the display 302 and air. The critical angle, $\Theta_c$, can be calculated as $\Theta_c$=sin−1(1/n), where n is the refractive index of the transparent material (glass/plastic) at the contact surface 304a of the transparent cover 304. The refractive index, n, can have a value of approximately 1.5 (n≈1.5), but may have a higher or lower value, depending on the type of glass or plastic used. In the case of n=1.5, $\Theta_c$=41.8° (≈42°, but shown as ≈45° in the figures for convenience).

Each of the active pixels 306 produces an emission cone having an angle that is equal to or greater than the critical angle, $\Theta_c$. (e.g., ≈45°). Light emitted by the active pixels 306 passes through the encapsulating glass 307, polarizer 305, and transparent cover 304. According to some embodiments, the active pixels 306 are configured to generate red illumination because longer optical wavelengths have greater penetration into the skin than shorter optical wavelengths. Use of active pixels 306 that produce red illumination can improve the performance of the FTIR-based optical finger reader apparatus 300a.

Where the skin of the finger 301 does not touch the contact surface 304a of the transparent cover 304, the impinging light is reflected via TIR (see light ray emitted by active pixel 306a). The reflected light is communicated through the transparent layers of the display 302 and the optical sensor 320, and impinges on the array of photosensors 322. For example, this reflected light is detected by photosensor 322a. Where the skin of the finger 301 touches the contact surface 304a, internal reflection is frustrated via FTIR (see light ray emitted by active pixel 306b). As a result of FTIR, some of the impinging light passes out of the transparent cover 304 and into the user's finger 301, and some of the impinging light is communicated through the transparent layers of the display 302 and the optical sensor 320, and impinges on the array of photosensors 322. For example, this reflected light is detected by photosensor 322b. The intensity of reflected light sensed by photosensor 322a (not subject to FTIR) is significantly greater than that of reflected light sensed by photosensor 322b due to FTIR. This causes ridges of the skin to be dark, and valleys of the skin to be bright. An image produced by signals read from the array of photosensors 322 can be processed to produce a fingerprint image that looks like an ink print of finger 301.

As is shown in FIG. 3A, the active pixels 306 are spaced apart from one another, typically with a fixed spacing provided between adjacent active pixel 306. The pinhole array 310 includes an array of pinholes 311 spaced apart from one another, typically with a fixed spacing provided between adjacent pinholes 311. The photosensors 322 are spaced apart from one another, typically with a fixed spacing provided between adjacent photosensors 322. According to various embodiments, the pinholes 311 of the pinhole array 310 are offset from the photosensors of the photosensor array 322. In some embodiments, the pinhole array 310 has the same pitch as the photosensor array 322. Typically, the pinholes 311 in the pinhole array 310 are offset in one dimension. In this arrangement, the pinhole array 310 is configured to collimate the reflected light rays to preferentially select light rays passing at an angle greater than or equal to the critical angle, $\Theta_c$, such that the selected light rays are communicated to the photosensors 322. In some embodiments, the array of active pixels 306 is offset from the pinhole array 310, both of which are offset from the array of photosensors 322 in one dimension. The active pixels 306 can have a size of about 50 µm, and the corresponding pinhole array pitch can also be about 50 µm.

As was previously discussed with reference to FIGS. 1 and 2, a processor is coupled to the display 304 and the optical sensor 320 and configured to control reading of signals from the photosensors 322 and to control illumination of selected active pixels 306 in accordance with a predefined scanning pattern. For example, the processor can implement a predefined scanning pattern that sequentially turns on only the $i^{th}$ row of active pixels 306a to emit light, while simultaneously reading signals only from the $(i+n)^{th}$ row of photosensor 322a, where n is an integer ranging from about 10 to about 100 (e.g., 30). The signals acquired from the $(i+n)^{th}$ row of photosensors 322a, when processed by image processing software implemented by the processor, represents a partial image (e.g., a frame) of the total fingerprint image. The processor repeats this scanning procedure until all of the rows of active pixels 306 have been selectively activated for the finger sensing region of the transparent cover 304. As will be described below, the row by row pixel activation scanning pattern described above represents one of a large number of predetermined scanning patterns that can be implemented by the processor.

With further reference to FIG. 3A, the spacing between and activated pixel 306a and its corresponding pinhole 311a and photosensor 322a is related to the thickness, h, of the display 304 defined between the array of active pixels 306 and the contact surface 304a of the transparent cover 304. In the representative example provided above, light emitted by a selected $i^{th}$ active pixel 306a (e.g., a row of active pixels) illuminated by the processor is detected by an $(i+n)^{th}$ photosensor 322a (e.g., a row of photosensors), wherein n represents the number of photosensors 322 spaced apart from the selected $i^{th}$ active pixel by a distance ≥2 h. The value 2 h is based on a reflection angle of 45 degrees, which in turn works only for the glass having a refractive index of ≥1.414. It is understood that the value of D is based on the particular reflection angle for a particular fingerprint reader design. The processor is configured to read a signal from the $(i+n)^{th}$ photosensor 322a (e.g., signals from the row of photosensors). The processor can then generate a partial image of the fingerprint using the signal from the $(i+n)^{th}$ photosensor 322a (e.g., signals from the row of photosensors).

In the illustrated example shown in FIG. 3A and other figures, the value of 2 h is based on a reflection angle of 45 degrees (for purposes of explanation, and not of limitation), which is in turn based on a refractive index, n>1.414. As previously discussed, the reflection angle can differ from 45 degrees, such as between about 40 and 50 degrees for example. The specific value of 2 h can be a generalized value that is a function of the critical angle. As is shown in FIG. 3A, the parameter D represents the spacing between the illumination pixel (e.g., 306a) and the corresponding pinhole (e.g., 311a). If it is assumed that the optical sensor 320 is configured to accept a light ray that is reflected at or greater than the critical angle, Θc, and, $n_1$ is the index of refraction outside of the contact surface 304a of the transparent cover 304 (where the finger 301 is placed), and $n_2$ is the refractive index of the transparent cover 304 (e.g., glass or plastic), then D can be characterized as D≥2 h*tan(Θc)=2 h*tan[sin−1($n_1/n_2$)]=2 h*tan[sin−1(1/$n_2$)], assuming that the medium outside of the transparent cover 304 in the region where the finger is placed is air with a refractive index of essentially n=1. In the case that Θc 45°, this expression reduces to D≥2 h.

Figure 3B:
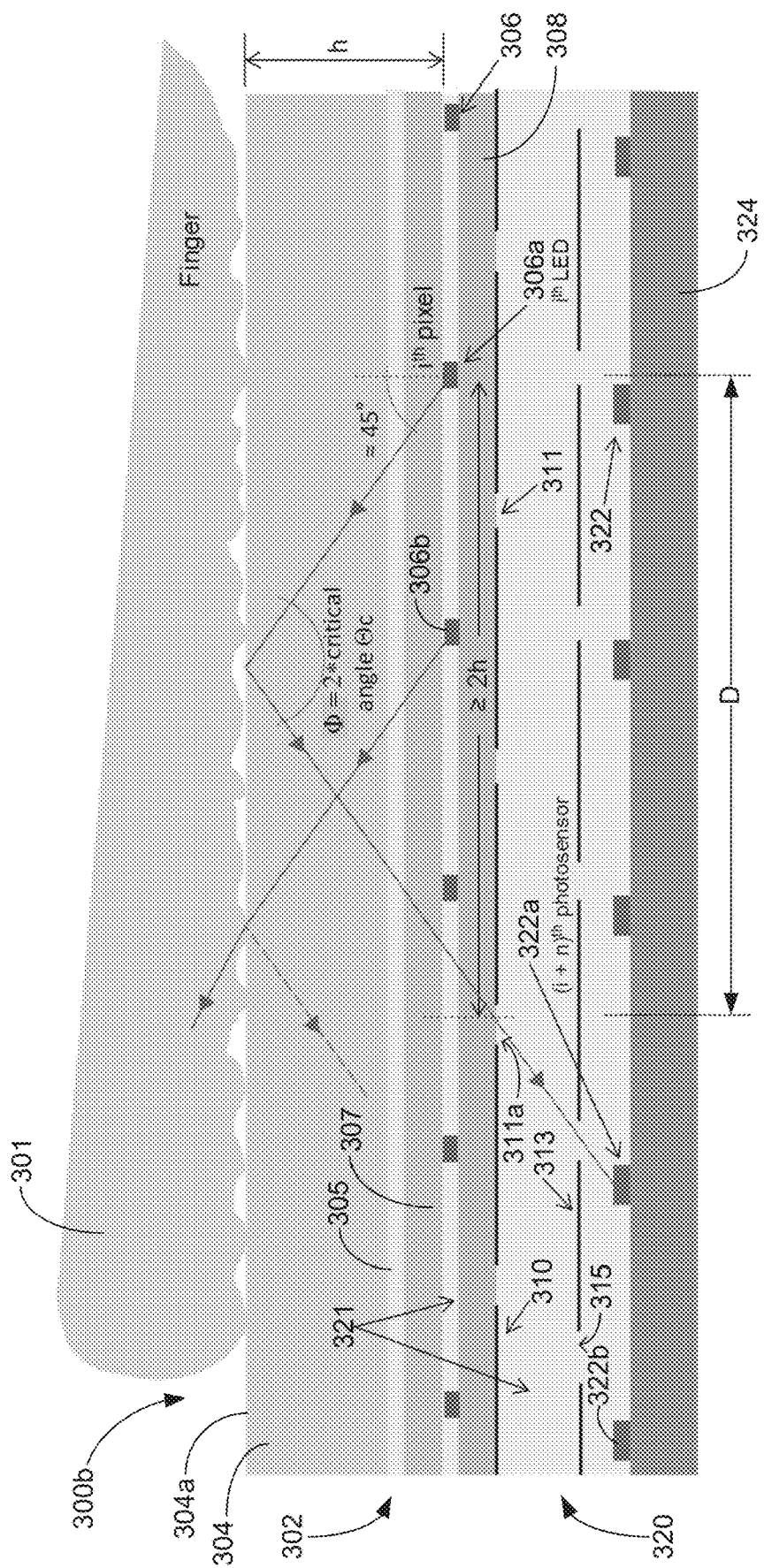
FIG. 3B shows an optical fingerprint reader apparatus configured for use with or within a transparent display in accordance with various embodiments.

FIG. 3B shows an optical fingerprint reader apparatus implemented in accordance with various embodiments. The optical fingerprint reader apparatus 300b shown in FIG. 3B is substantially the same as that shown in FIG. 3A, but includes an additional pinhole array 313, also referred to as a pinhole mask. A second pinhole array 313 comprising an array of pinholes 315 is positioned within the dielectric filling material 321 of the optical sensor 320 between the first pinhole array 310 and the array of photosensors 322. The array of second pinholes 315 are offset from the first pinholes 311 and the array of photosensors 322 in the same direction that the first pinhole array 310 was offset. The addition of the second pinhole array 313 serves to further collimate the reflected light rays to preferentially select rays at an angle greater than or equal to critical angle, $Θ_c$, such that the selected light rays are communicated to the photosensors 322.

Figure 4:
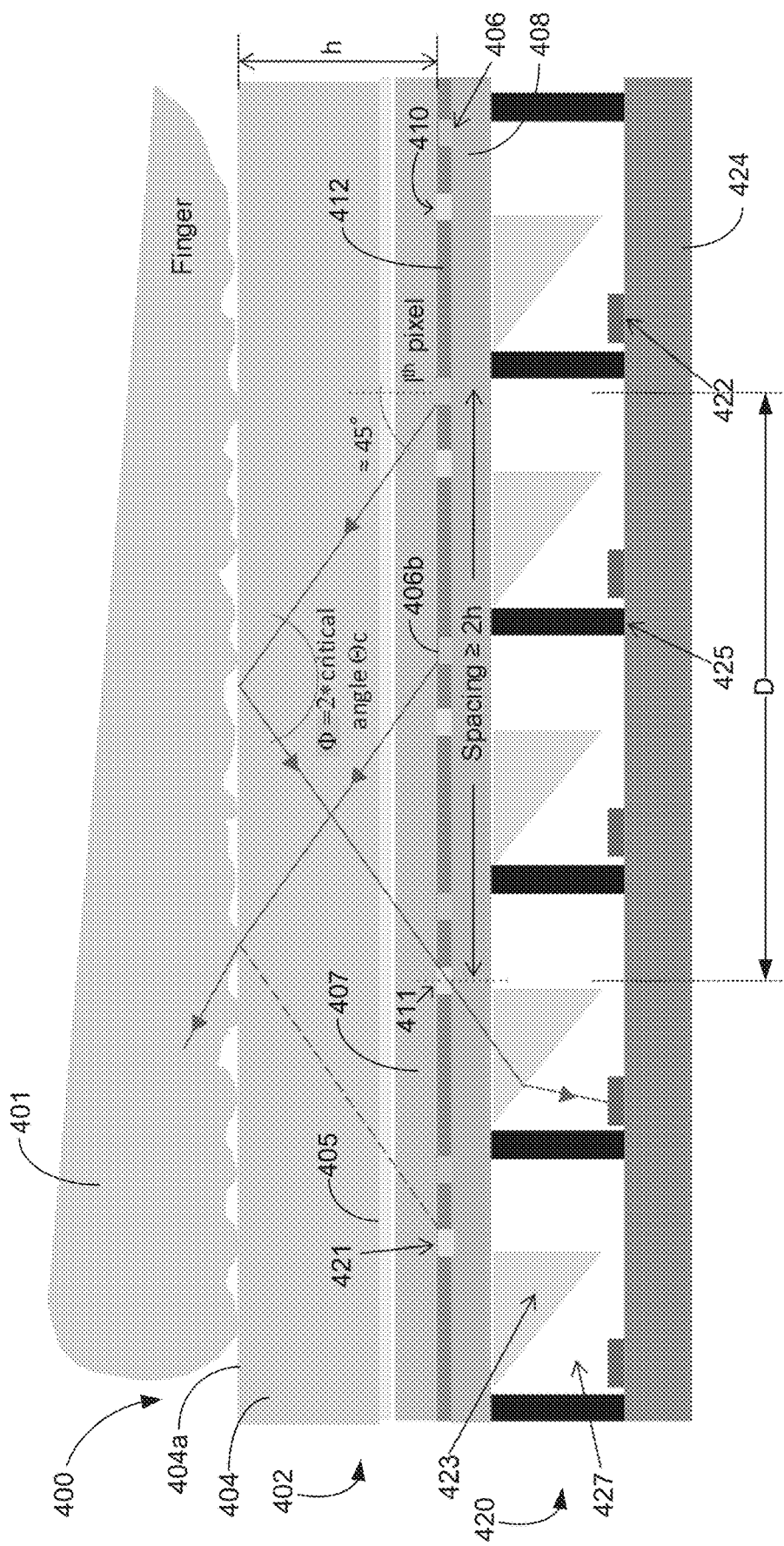
FIG. 4 shows an optical fingerprint reader apparatus configured for use with or within an opaque display in accordance with various embodiments.

FIG. 4 shows an optical fingerprint reader apparatus implemented in accordance with various embodiments. The optical fingerprint reader apparatus 400 includes a display 402 optically coupled to an optical sensor 420 via a pinhole array 410. In the embodiment shown in FIG. 4, the pinhole array 410 is integral to the display 402. The display 402 can be any of the displays described herein (e.g., AMOLED) or any other type of display that includes an array of illuminatable active pixels. The display 402 can comprise a touch screen or be configured as a non-touch-sensitive screen.

Display 402 shown in FIG. 4 includes a transparent cover 404 (e.g., cover glass or plastic) which defines a contact surface 404a of the optical fingerprint reader apparatus 400 to which a finger 401 can be applied. The transparent cover 404 has a specified refractive index, such as about 1.5 (e.g., n≈1.5), and can have a thickness of about 0.5 mm (e.g., cover glass plus adhesive). The transparent cover 404 is in contact with a polarizer 405, which can have a thickness of about 50 μm. Active pixels 406, preferably arranged as an array of active pixels 406, are disposed on an opaque substrate 412. As previously discussed, the active pixels 406 are preferably red emitters, such as red OLED emitters. TFT glass 408 is in contact with the substrate 412. Encapsulating glass 407 is disposed between the polarizer 405/transparent cover 404 and the array of active pixels 406. It is understood that the component layers of the display 402 can vary from those shown in FIG. 4, and that the particular component layers of the display 402 shown in FIG. 4 represent non-limiting examples of constituent elements of a display that can be optically coupled to the optical sensor 420 to define an optical fingerprint reader apparatus of the present disclosure. For example, the display 402 need not include the polarizer 405.

In the embodiment shown in FIG. 4, the substrate 412 is opaque and, therefore, blocks light reflecting from the contact surface 404a from passing into the optical sensor 420. Apertures or pinholes 411 are provided in the substrate 412 and arranged to define a pinhole array 410. The pinhole array 410 provided in the opaque substrate 412 is arranged and functions similarly to the pinhole array 311 shown in FIGS. 3A and 3B. A dielectric filling material 421 is disposed within the pinholes 411. As was previously discussed, the dielectric filling material 421 has a refractive index equivalent to or about the same as that of the transparent cover 404 (e.g., n≈1.5). The encapsulating glass 407 and the TFT glass 408 can have a thickness of about 100 μm. The total thickness, h, of the display 404 defined between the array of active pixels 406 and a contact surface 404a of the transparent cover 404 is about 550 μm. As was discussed previously, the value of h, 2 h, D, n, or any other dimensions or parameters will vary depending on the particular design of the display 402 and optical sensor 420.

The optical sensor 420 includes an array of photosensors 422 disposed on a substrate 424. The photosensors 422 can take the form of any sensor which is sensitive to light, examples of which are discussed above. The optical sensor 420 includes an array of microprisms 423 disposed between the pinhole array 410 and the photosensor array 422. Each of the photosensors 422 has an associated microprism 423. The microprisms 423 are formed from a transparent material (glass or plastic) having a refractive index equivalent to or about the same as transparent material of the display 402 (e.g., n≈1.5) and the dielectric filling material 421. In the embodiment shown in FIG. 4, the microprisms 423 are separated from the photosensors 422 by air 427.

In some embodiments, dielectric filling material 421 can be disposed between the microprisms 423 and the photosensors 422 of a different, most likely lower, refractive index than the transparent material (e.g., glass or plastic of the transparent cover 404) and other dielectric filling material of the display 402 and optical sensor 420. The value of the refractive index difference between the transparent cover 404 and dielectric filling material 421 of the display 402, and the dielectric filling material between the microprisms 423 and photosensors 422, will determine the angle of the prisms in the microprism array.

The microprisms 423 serve to direct reflected light that passes through the pinholes 411 onto the photosensors 422. The difference in refractive indices at the microprism/air interface or microprism/air/dielectric fill material interface also serves to direct the reflected light that passes through the pinholes 411 onto the photosensors 422. In some embodiments, the optical sensor 420 includes an opaque barrier 427 disposed between adjacent photosensors 422. The opaque barriers 427 are configured to optically isolate the photosensors 422 from one another. In some embodiments, the optical sensor 420 can include an array of microlenses as an alternative to the microprisms 423, an example of which is shown in FIG. 5B.

Figure 5A:
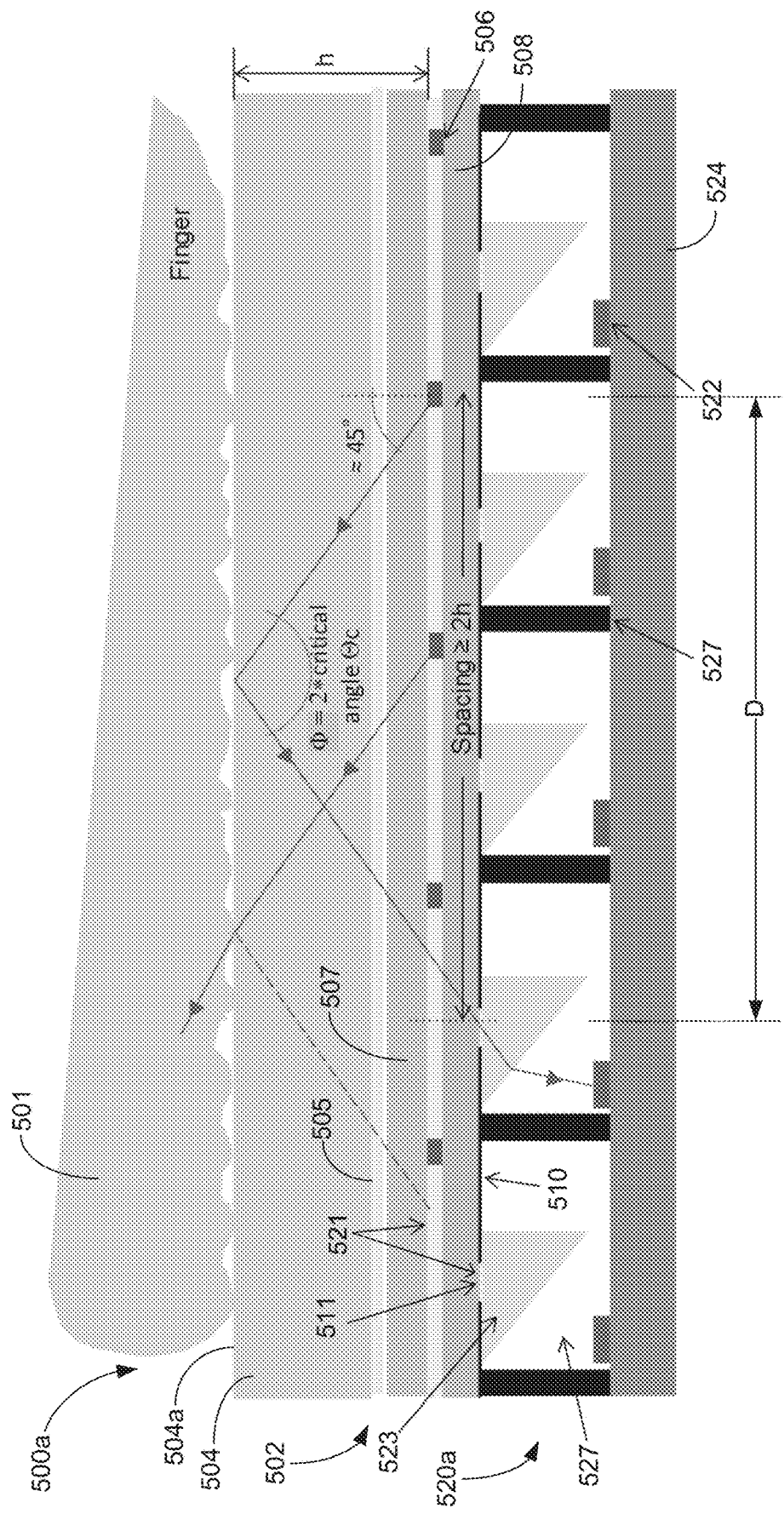
FIG. 5A shows an optical fingerprint reader apparatus configured for use with or within a transparent display in accordance with various embodiments.
Figure 5B:
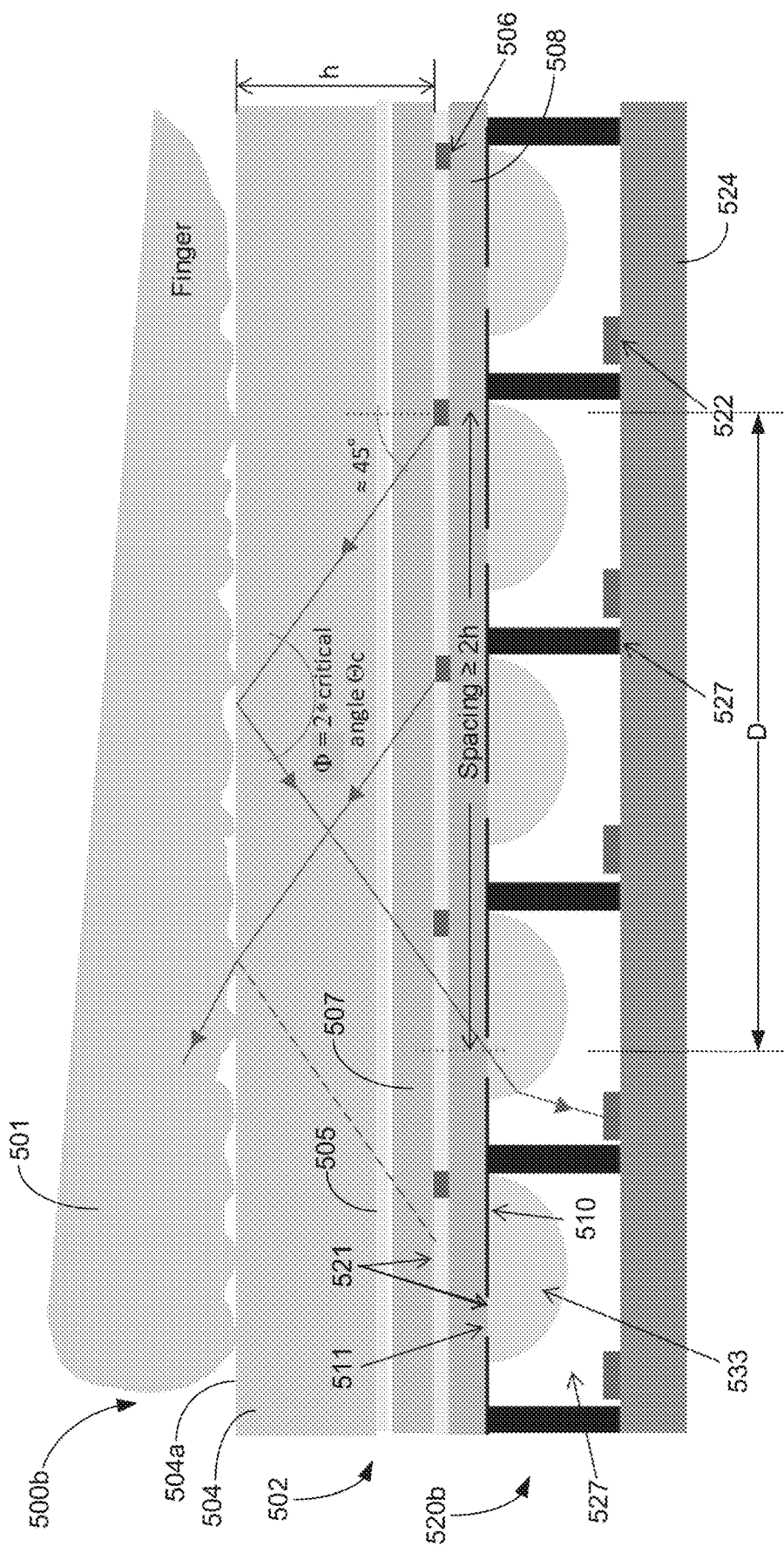
FIG. 5B shows an optical fingerprint reader apparatus configured for use with or within a transparent display in accordance with various embodiments.

FIGS. 5A and 5B show an optical fingerprint reader apparatus implemented in accordance with various embodiments. The optical fingerprint reader apparatus 500a, 500b includes a display 502 optically coupled to an optical sensor 520a, 520b via a pinhole array 510. The display 502 can be any of the displays described herein (e.g., AMOLED) or any other type of display that includes an array of illuminatable active pixels. The display 502 can comprise a touch screen or be configured as a non-touch-sensitive screen.

Display 502 includes a transparent cover 504 (e.g., cover glass or plastic) which defines a contact surface 504a of the optical fingerprint reader apparatus 500a, 500b to which a finger 501 can be applied. The transparent cover 504 has a specified refractive index, such as about 1.5 (e.g., n≈1.5). The transparent cover 504 can have a thickness of about 0.5 mm (e.g., cover glass plus adhesive). The transparent cover 504 is in contact with a polarizer 505, which can have a thickness of about 50 µm. Active pixels 506, preferably arranged as an array of active pixels 506, are disposed on TFT glass 508. The TFT glass 508 serves as a transparent substrate upon which the active pixels 506 are disposed. Encapsulating glass 507 is disposed between the polarizer 505/transparent cover 504 and the array of active pixels 506. It is understood that the component layers of the display 502 can vary from those shown in FIGS. 5A and 5B, and that the particular component layers of the display 502 shown in FIGS. 5A and 5B represent non-limiting examples of constituent elements of a display that can be optically coupled to the optical sensor 520a, 520b to define an optical fingerprint reader apparatus of the present disclosure.

A dielectric filling material 521 is disposed between adjacent active pixels 506 and fills the void between the encapsulating glass 507 and the TFT glass 508. The dielectric filling material 521 has a refractive index equivalent to or about the same as that of the transparent cover 504 (e.g., n≈1.5) to minimize internal reflections at dielectric interfaces. The encapsulating glass 507 and the TFT glass 508 can have a thickness of about 100 µm. The total thickness, h, of the display 504 defined between the array of active pixels 506 and a contact surface 504a of the transparent cover 504 is about 550 µm.

The optical sensor 520a, 520b includes an array of photosensors 522 disposed on a substrate 524. The photosensors 522 can take the form of any sensor which is sensitive to light, examples of which are provided hereinabove. The optical fingerprint reader apparatus 500a, 500b includes a pinhole array 510, also referred to as a pinhole mask. The pinhole array 510 comprises an array of pinholes 511.

The pinhole array 510 shown in FIGS. 5A and 5B is affixed (e.g., via an adhesive) to the surface of the TFT glass 508 facing the array of photosensors 522. The pinhole array 510 includes an array of pinholes 511, each of which is filled with dielectric filling material 521. The pinhole array 510 can be a pinhole mask comprising black chrome deposited on a substrate with an array of holes provided therethrough. The pinhole mask can be adhesively applied directly to the surface of the TFT glass 508 that faces the array of photosensors 522. The pinhole array 510 serves to collimate light rays reflected by the contact surface 504a to preferentially select rays at an angle greater than or equal to critical angle, $\Theta_c$, such that the selected light rays are communicated to the photosensors 522.

The optical sensor 520a shown in FIG. 5A includes an array of microprisms 523 disposed between the pinhole array 510 and the photosensor array 522. Each of the photosensors 522 has an associated microprism 523. The optical sensor 520b shown in FIG. 5B includes an array of microlenses 533 disposed between the pinhole array 510 and the photosensor array 522. Each of the photosensors 522 has an associated microlens 533. The microlenses 533 can be spherical lenses or cylindrical lenses.

In some embodiments, dielectric filling material 521 can be disposed between the microprisms 523/microlenses 533 and the photosensors 522 of a different, most likely lower, refractive index than the transparent material (e.g., glass or plastic of the transparent cover 504) and other dielectric filling material of the display 502 and optical sensor 520. The value of the refractive index difference between the transparent cover 504 and dielectric filling material 521 of the display 502 and the dielectric filling material between the microprisms 523/microlenses 533 and photosensors 422 will determine the angle of the prisms in the array of microprisms 523, or shape (optimal focal length) of the microlenses 533.

The microprisms 523 and microlenses 533 are formed from a transparent material (glass or plastic) having a refractive index equivalent to or about the same as transparent material of the display 502 (e.g., n≈1.5) and the dielectric filling material 521. In the embodiment shown in FIGS. 5A and 5B, the microprisms 523 and microlenses 533 are separated from the photosensors 522 by air 527. The microprisms 523 and microlenses 533 serve to direct reflected light that passes through the pinholes 511 onto the photosensors 522. The difference in refractive indices at the microprism (or microlens)/air interface or the microprism (or microlens)/air/dielectric filling material interface also serves to direct the reflected light that passes through the pinholes 511 onto the photosensors 522. In some embodiments, the optical sensor 520a, 520b includes an opaque barrier 527 disposed between adjacent photosensors 522. The opaque barriers 527 are configured to optically isolate the photosensors 522 from one another.

Figure 6:
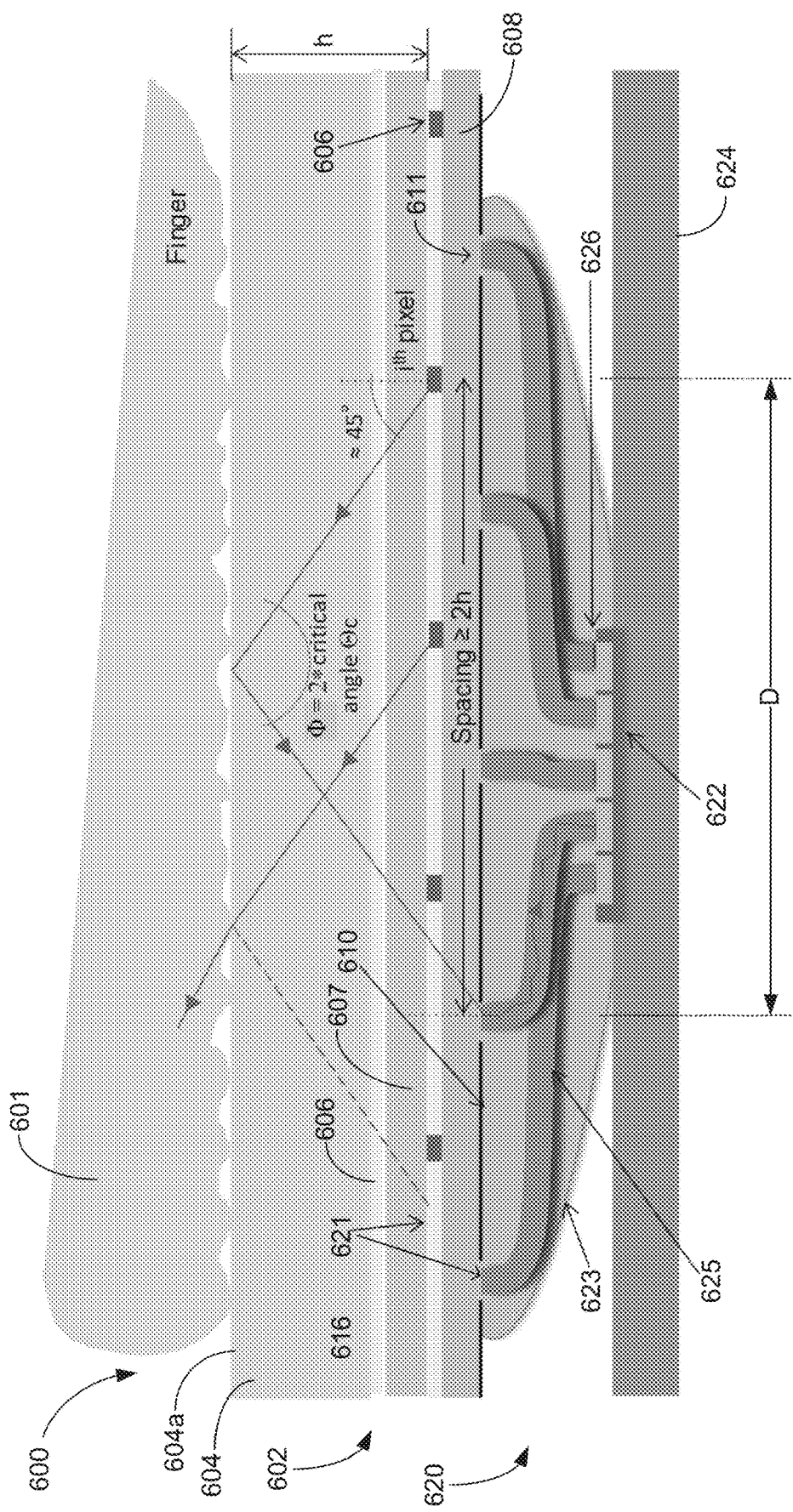
FIG. 6 shows an optical fingerprint reader apparatus configured for use with or within a transparent display in accordance with various embodiments.

FIG. 6 shows an optical fingerprint reader apparatus implemented in accordance with various embodiments. The optical fingerprint reader apparatus 600 includes a display 602 optically coupled to an optical sensor 620 via a pinhole array 610. The display 602 can be any of the displays described herein (e.g., AMOLED) or any other type of display that includes an array of illuminatable active pixels. The display 602 can comprise a touch screen or be configured as a non-touch-sensitive screen.

Display 602 includes a transparent cover 604 (e.g., cover glass or plastic) which defines a contact surface 604a of the optical fingerprint reader apparatus 600 to which a finger 601 can be applied. The transparent cover 604 has a specified refractive index, such as about 1.5 (e.g., n≈1.5). The transparent cover 604 can have a thickness of about 0.5 mm (e.g., cover glass plus adhesive). The transparent cover 604 is in contact with a polarizer 605, which can have a thickness of about 50 µm. Active pixels 606, preferably arranged as an array of active pixels 606, are disposed on TFT glass 608. The TFT glass 608 serves as a transparent substrate upon which the active pixels 606 are disposed. Encapsulating glass 607 is disposed between the polarizer 605/transparent cover 604 and the array of active pixels 606. It is understood that the component layers of the display 602 can vary from those shown in FIG. 6, and that the particular component layers of the display 602 shown in FIG. 6 represent non-limiting examples of constituent elements of a display that can be optically coupled to the optical sensor 620 to define an optical fingerprint reader apparatus of the present disclosure.

A dielectric filling material 621 is disposed between adjacent active pixels 606 and fills the void between the encapsulating glass 607 and the TFT glass 608. The dielectric filling material 621 has a refractive index equivalent to or about the same as that of the transparent cover 604 (e.g., n≈1.5) to minimize internal reflections at dielectric interfaces. The encapsulating glass 607 and the TFT glass 608 can have a thickness of about 100 µm. The total thickness, h, of the display 604 defined between the array of active pixels 606 and a contact surface 604a of the transparent cover 604 is about 550 µm.

The pinhole array 610 shown in FIG. 6 is affixed (e.g., via an adhesive) to the surface of the TFT glass 608 facing an array of photosensors 622. Alternatively, the pinhole array 610 can be integrated into an opaque substrate that supports the active pixels 606 (see, e.g, display 402 and pinholes 411 in substrate 412 shown in FIG. 4). The pinhole array 610 includes an array of pinholes 611, each of which can be filled with dielectric filling material 621. The pinhole array 610 can be a pinhole mask comprising black chrome deposited on a substrate with an array of holes provided therethrough. The pinhole mask can be adhesively applied directly to the surface of the TFT glass 608 that faces the array of array of photosensors 622. The pinhole array 610 serves to collimate light rays reflected by the contact surface 604a to preferentially select rays at an angle greater than or equal to critical angle, $\Theta_c$, such that the selected light rays are communicated to the array of photosensors 622.

The optical sensor 620 includes a fiber-optic taper 623 comprising individual component fibers 625. Each of the component fibers 625 is optically coupled to one of the pinholes 611 and one of the photosensors of the photosensor array 622. The individual component fibers 625 couple light passing through individual pinholes 611 of the pinhole array 610 to individual photosensors of the photosensor array 622. The fiber-optic taper 623 is optically coupled to the photosensor array 622 via optical index matching material (e.g., optical cement) or some other coupling medium. In some embodiments, the photosensor array 622 can be implemented as an array of photodiodes. In other embodiments, the array of photosensors 622 can be implemented as any other indexable, readable array of photosensitive pixels, such as a CMOS sensor or a CCD sensor.

The fiber-optic taper 623 provides for a one-to-one mapping of pinholes 611 to pixels in the photosensor array 622. According to some embodiments, the fiber-optic taper 623 is configured to reduce the pitch of the pinhole array 610 down to a size that matches the size of the photosensors 622. For example, the size of the active pixel 606 (e.g., OLED pixel) and corresponding pinhole array pitch can be 50 µm, but the pixel size in the photosensor array 622 can be 5 µm. In this illustrative example, a 10-to-1 reduction fiber-optic taper 623 can be used to couple each individual pinhole 611 to an individual pixel in the photosensor 622.

According to various embodiments, and as previously discussed, using the display itself for illumination for the optical fingerprint reader allows many different scanning illumination patterns to be implemented by the process coupled to the optical fingerprint reader. Different illumination scanning patterns may be advantageous for different situations or conditions. For example, certain patterns may enhance contrast, while others may be helpful in reducing the time to acquire a useful image. This includes various linear (e.g., rectangular, square, 3 to 10 sided polygonal), circular, spiral, elliptical, and other shaped scanning patterns, with and without complex pixelated arrangements. Various arrangements of the illumination pixels in a scanning pattern can enhance both contrast and resolution, depending on the particular embodiment, and its design details, such as the mask pattern and micro-optics arrays (e.g., lenses, prisms, etc.).

The following figures and associated description illustrate embodiments of optical fingerprint reader apparatuses that exploit a specular reflection contrast detection mechanism in accordance with various embodiments. It is understood that an optical fingerprint reader apparatus that exploits a specular reflection contrast detection mechanism can incorporate any of the structures and functionality described with respect to the FTIR contrast detection embodiments shown in FIGS. 3A-6 and those disclosed in commonly-owned U.S. Published Patent Application No. 2019/0311176 (U.S. patent application Ser. No. 16/380,402, filed Apr. 10, 2019), which is incorporated herein by reference in its entirety.

A significant problem in fingerprint reader design is obtaining high contrast for skin ridges versus valleys. Most conventional contact fingerprint readers are essentially pixelated proximity sensors. This is the case for optical, capacitive, and other less common types of fingerprint readers, such as those that incorporate thermal and ultrasonic fingerprint sensors. Conventional optical fingerprint readers typically exploit the principle of Frustrated Total Internal Reflection (FTIR) as their contrast detection mechanism. However an alternative contrast mechanism is specular reflection (SR), which provides several advantages over FTIR contrast detection mechanisms.

Figure 11:
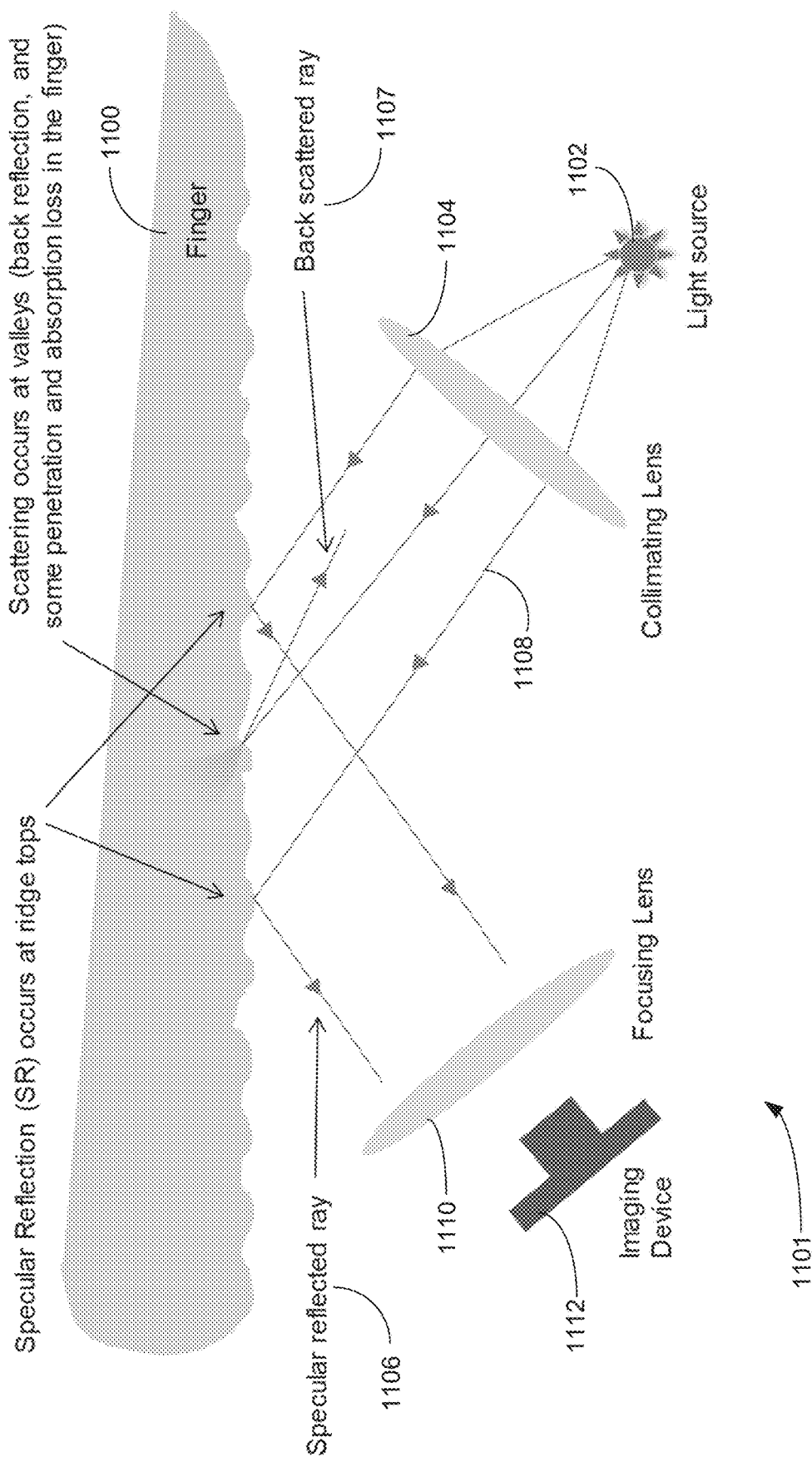
FIGS. 11-13 are representative embodiments of an optical fingerprint reader apparatus that exploits a specular reflection contrast detection mechanism in accordance with various embodiments.
Figure 12:
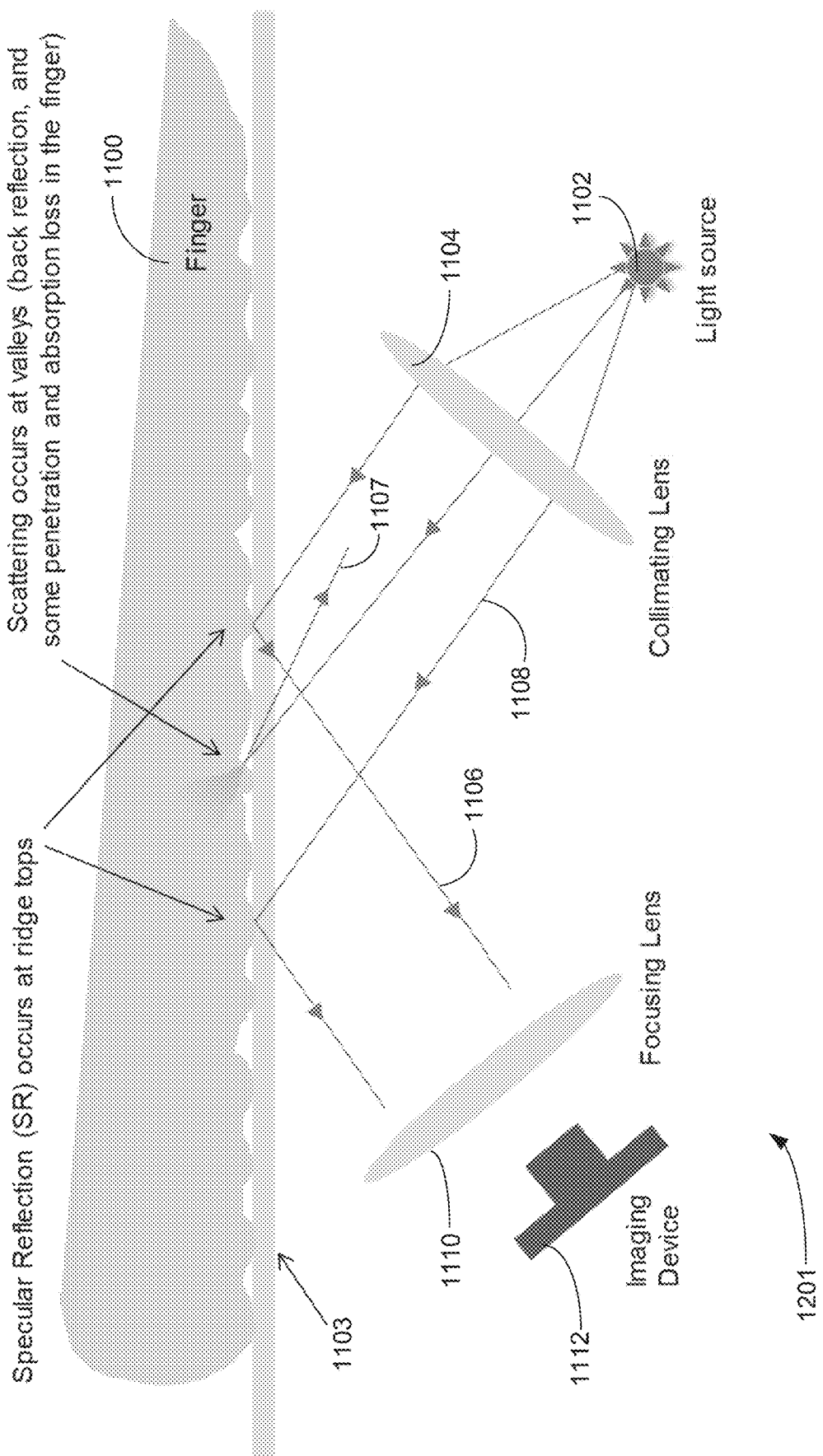
Figure 13:
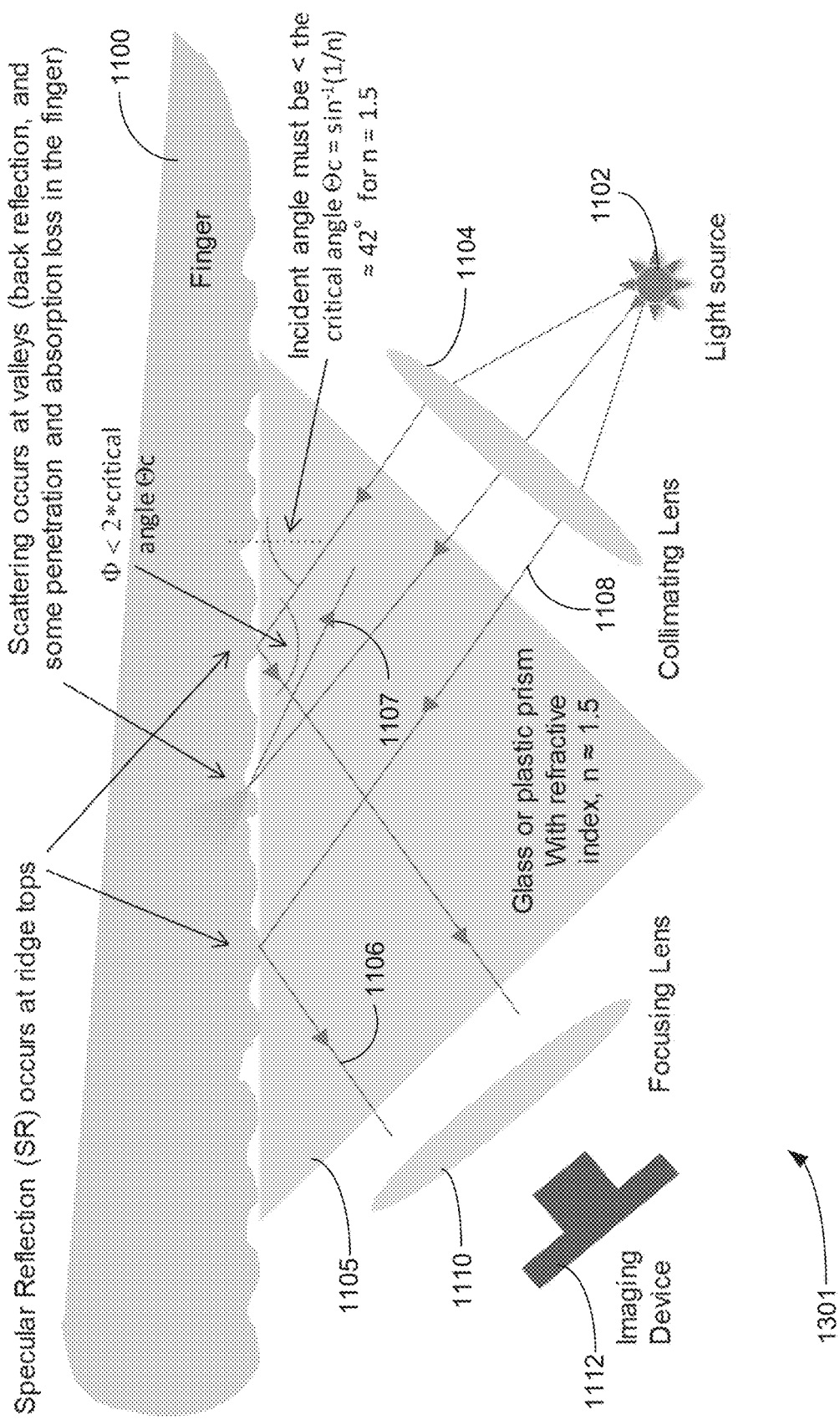

Referring now to FIGS. 11-13, representative embodiments of an optical fingerprint reader apparatus 1101, 1201, 1301 that exploits a specular reflection contrast detection mechanism can work with a transparent platen 1103 of glass or plastic onto which the user places a finger or fingers 1100. Some embodiments of an optical fingerprint reader apparatus can work without a transparent platen 1103 of glass or plastic (see, e.g., FIG. 11). Other embodiments of an optical fingerprint reader apparatus can work with a transparent prism 1105 of glass or plastic (see, e.g., FIG. 13).

In any of these and other representative embodiments disclosed herein, illumination is delivered from a light source 1102 at an angle with respect to the finger contact surface 1103, 1105 and preferably with a beam pattern 1108 that increases or maximizes contrast due to specular reflection (e.g., via use of a collimating lens 1104). If a glass or plastic platen 1103 or prism 1105 is used, illumination is delivered at an angle, Φ, that is less than the critical angle, $\Theta c$, with respect to the finger contact surface 1103, 1105. For example, and as show in FIG. 13, the incident angle of illumination must be less than the critical angle $\Theta c = \sin^{-1}(1/n) \approx 42°$ for n=1.5. In this and other examples, the angle, Φ, between the incident and reflected rays from the transparent platen 1103 can be characterized by Φ<2*critical angle, $\Theta c$. Polarization of the illumination may also be used to further enhance the contrast due to specular reflection. The reflected light (specular reflected rays) 1106 from the fingerprint is then imaged by a imaging device 1112, which may comprise or be optically coupled to a focusing lens 1110. The imaging device 1112 can include a CMOS sensor or a CCD sensor (e.g., a camera).

The flat, relatively smooth tops of the fingerprint ridges have good specular reflectivity (see specular reflected rays 1106), while the valleys cause scattering of the light rays (see backscattered rays 1107). This makes the ridge tops appear bright, and the valleys appear dark when imaged by the imaging device 1112. Because shorter optical wavelengths penetrate the skin less, using green or blue illumination can improve the performance of the specular reflection contrast detection mechanism for a fingerprint reader versus longer wavelengths (e.g., red illumination).

Embodiments disclosed herein use specular reflection to create an under-display fingerprint reader which uses an OLED display (or other display technology) for illumination. Some embodiments disclosed herein use specular reflection to create an under-display fingerprint reader employing an auto-scanning design which uses an OLED display (or other display technology) for illumination. FIGS. 14-17 illustrate various embodiments of an under-display fingerprint reader sensor that uses a specular reflection contrast detection mechanism. The display of the under-display fingerprint readers shown in FIGS. 14-17 can be illuminated using a variety of illumination patterns. For example, an OLED display can be illuminated by sequentially illuminating a single row of pixels while capturing the reflected light via a corresponding offset row of photosensors placed below the screen. Other illumination patterns and detection schemes can be implemented by the under-display fingerprint readers shown in FIGS. 14-17, several examples of which are disclosed herein. Embodiments are directed to a design for an auto-scanning under-display specular reflection fingerprint sensor (FPS) that is designed to be incorporated into an LED or AMOLED-based touch-screen display.

The under-display specular reflection fingerprint sensor embodiments shown in FIGS. 14-17 use the display LEDs for illumination, and add one or more very thin layers of material, as well as an array of photosensors. In addition, some embodiments incorporate masks, which are essentially an array of pinholes or slits, and micro-optical arrays such as a micro lens array, or a micro prism array. Some embodiments may also incorporate polarizers to further enhance the contrast due to specular reflection. The disclosed under-display specular reflection fingerprint sensor embodiments can take advantage of the pixel control of the LEDs in the screen, and use this pixel control to create a scanning illumination pattern that automatically scans during imaging of the fingerprint. This novel approach of using a scanning illumination pattern and synchronizing it with a corresponding scanned and offset array of photosensors for fingerprint imaging via specular reflection has a number of advantages, and can be configured in various ways to optimize the imaging performance.

Figure 14:
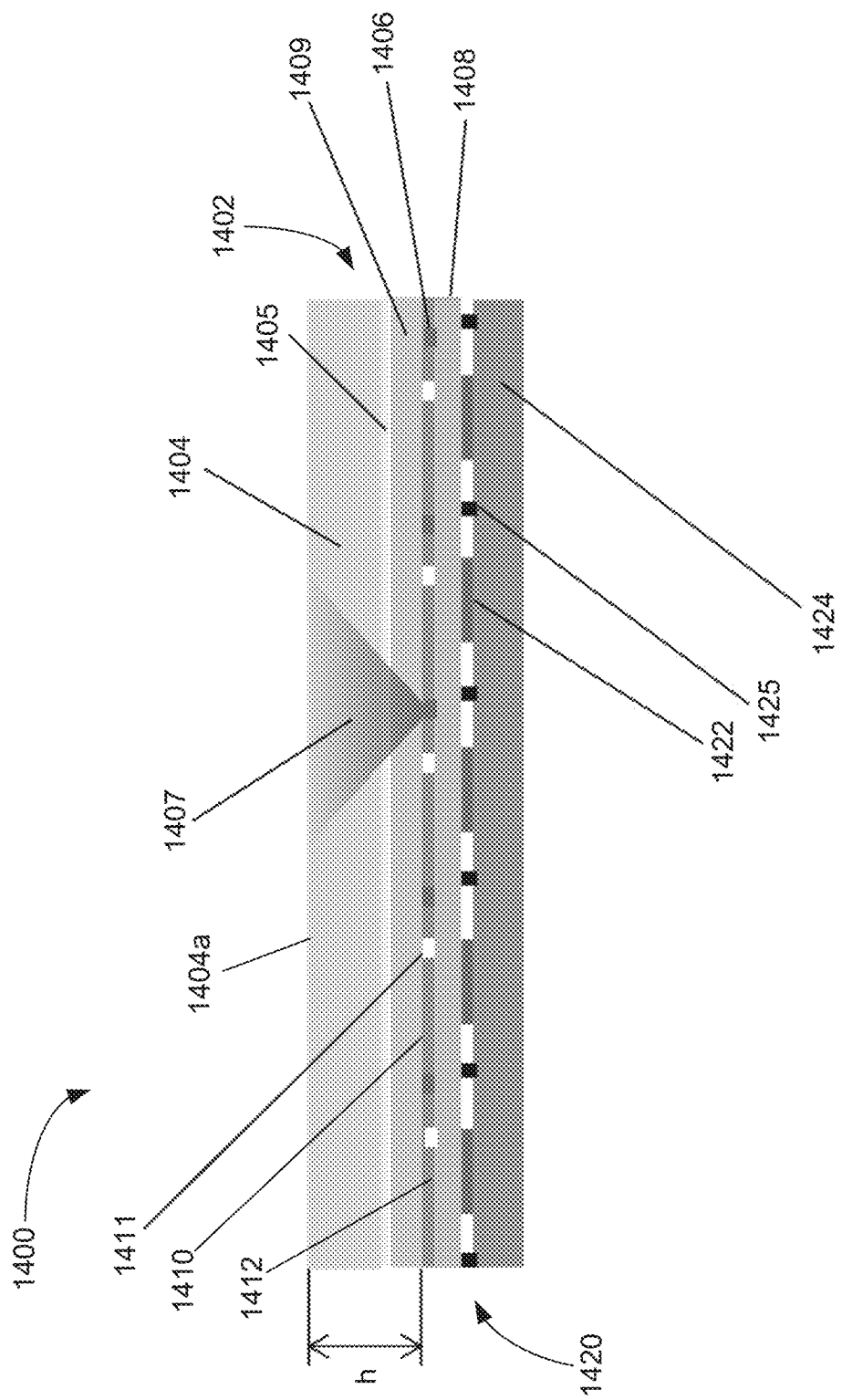
FIG. 14 shows a cross-section of a specular reflection fingerprint sensor which can be incorporated in an under-display fingerprint reader in accordance with various embodiments.

FIG. 14 shows a cross-section of a specular reflection fingerprint sensor which can be incorporated in an under-display fingerprint reader in accordance with various embodiments. The specular reflection FPS 1400 shown in FIG. 14 includes a display 1402 optically coupled to an optical sensor 1420 via a pinhole array 1410. In the embodiment shown in FIG. 14 (and in FIGS. 15-22), the display 1402 is implemented as an OLED display, such as an AMOLED. In some embodiments, the display 1402 shown in FIG. 14 (and in FIGS. 15-22) can be implemented as an LTPS OLED display screen. In other embodiments, the display 1402 shown in FIG. 14 (and in FIGS. 15-22) can be implemented as an LTPO OLED display screen. It is understood that the display 1402 shown in FIG. 14 (and in FIGS. 15-22) can be implemented according to other technologies (e.g., other LED technologies) that utilize an array of active or self-illuminating pixels as the illumination source, rather than a separate backlight (e.g., an LCD backlight).

The specular reflection FPS 1400 includes a display 1402 optically coupled to an optical sensor 1420 via a pinhole array 1410. In the embodiment shown in FIG. 14, the pinhole array 1410 is integral to the display 1402. The display 1402 can be any of the displays described herein (e.g., AMOLED) or any other type of display that includes an array of illuminatable active pixels. The display 1402 can comprise a touch screen or be configured as a non-touch-sensitive screen.

Display 1402 shown in FIG. 14 includes a transparent cover 1404 (e.g., cover glass or plastic) which defines a contact surface 1404a of the specular reflection FPS 1400 to which a finger can be applied. The transparent cover 1404 has a specified refractive index, such as about 1.5 (e.g., n≈1.5), and can have a thickness of about 0.5 mm (e.g., cover glass plus adhesive). The transparent cover 1404 is in contact with an optional polarizer 1405, which can have a thickness of about 50 μm. Active pixels 1406, preferably arranged as an array of active pixels 1406, are disposed on an opaque substrate 1412. As previously discussed, the active pixels 1406 are preferably green or blue emitters, such as green or blue OLED emitters. The active pixels 1406, when implemented as OLED emitters, can produce an emission cone 1407 having an angle <45°. TFT glass 1408 (e.g., ~100 μm in thickness) is in contact with the substrate 1412. Encapsulating glass 1409 (e.g., ~100 μm in thickness) is disposed between the polarizer 1405/transparent cover 1404 and the array of active pixels 1406. It is understood that the component layers of the display 1402 can vary from those shown in FIG. 14 (and in FIGS. 15-17), and that the particular component layers of the display 1402 shown in FIG. 14 (and in FIGS. 15-17) represent non-limiting examples of constituent elements of a display that can be optically coupled to the optical sensor 1420 to define a specular reflection FPS of the present disclosure. For example, the display 1402 need not include the polarizer 1405.

In the embodiment shown in FIG. 14, the substrate 1412 is opaque and, therefore, blocks light reflecting from the contact surface 1404a from passing into the optical sensor 1420. Apertures or pinholes 1411 are provided in the substrate 1412 and arranged to define a pinhole array 1410. The pinhole array 1410 provided in the opaque substrate 1412 is arranged and functions similarly to the pinhole array 411 shown in FIG. 4. A dielectric filling material or fill air can be disposed within the pinholes 1411. As was previously discussed, the dielectric filling material has a refractive index equivalent to or about the same as that of the transparent cover 1404 (e.g., n≈1.5). The encapsulating glass 1409 and the TFT glass 1408 can have a thickness of about 100 μm. The total thickness, h, of the display 1402 defined between the array of active pixels 1406 and the contact surface 1404a of the transparent cover 1404 can be about 550 μm. As was discussed previously, the value of h, 2 h, D, n, or any other dimensions or parameters will vary depending on the particular design of the display 1402 and optical sensor 1420.

The optical sensor 1420 includes an array of photosensors 1422 disposed on a substrate 1424. The photosensors 1422 can take the form of any sensor which is sensitive to light, examples of which are discussed above. In the embodiment shown in FIG. 14, the photosensors 1422 are separated from one another by an opaque barrier 1425, which can be molding or other opaque structure. The opaque barriers 1425 are configured to optically isolate the photosensors 1422 from one another.

The under-display specular reflection fingerprint sensor embodiments shown in FIGS. 14-17 allow the fingerprint sensor to be integrated with the display, and still keep the overall thickness of the display very small, and well within the requirements of mobile phone and tablet makers. The disclosed specular reflection fingerprint sensor embodiments leverage the existing display for illumination, and minimizes the need for complex optics. This keeps the cost of the hardware relatively low. Using specular reflection, fingerprint sensors of the present disclosure produce high-contrast images of the fingerprint ridges directly, without the need for extensive post-processing to enhance a poor-contrast image.

This also keeps computational cost to a minimum, and produces much better images for use with fingerprint recognition algorithms.

The disclosed specular reflection fingerprint sensor designs, especially the simpler embodiments, can easily be expanded in area to cover the entire screen, thereby making a full-screen fingerprint reader that can acquire the fingerprint image regardless of where the user places his or her finger. By using the touch sensing capability built into the screen itself, a full-screen version of the auto-scanning fingerprint sensor can minimize fingerprint image acquisition time by detecting the location of the user's finger first, and then limiting the scan to only a partial area of the screen centered around the user's finger. This approach also allows the size of the fingerprint image to be made as large as is needed to optimize the biometric performance. Larger fingerprint images provide better performance in terms of both security and reliability for the user.

By using masks, and scanning the illumination and sensor arrays, the disclosed specular reflection fingerprint sensor designs are much less susceptible to interference from external spurious light, such as bright sunlight. Using the display itself for illumination allows many different scanning illumination patterns to be used. Different illumination scanning patterns may be advantageous for different situations or conditions. For example, certain patterns may enhance contrast, while others may be helpful in reducing the time to acquire a useful image. This includes various linear, circular, elliptical and other shaped scanning patterns, with and without complex pixelated arrangements. Various arrangements of the illumination pixels in a scanning pattern can enhance both contrast and resolution, depending on the particular embodiment, and its design details, such as the mask pattern and micro-optics arrays (lenses, prisms, etc.).

With the specular reflection FPS integrated under the touch screen, the display can also be used to provide directions, information and feedback to the user. This can be very advantageous in enhancing the user experience during acquisition of a fingerprint image for both enrollment, and authentication. The user can be guided as to where to place his or her finger, how long to hold it in place, when and if the finger must be lifted, and placed again, when to place a different finger, etc. This can be especially useful during enrollment, when multiple finger placements will most likely be required, and fingerprint image quality is important. The user can be kept informed during the process.

Figure 15A:
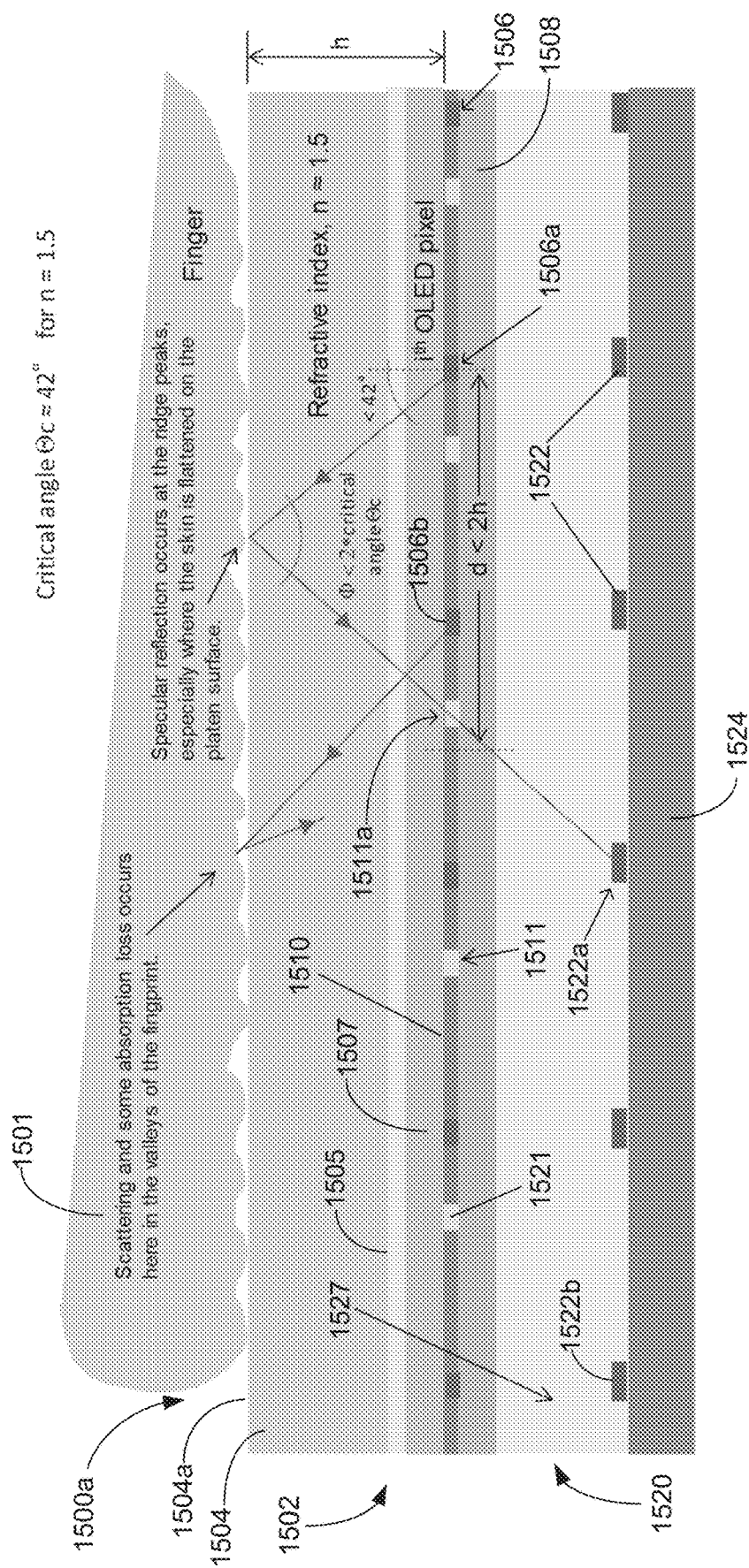
FIGS. 15A and 15B are cross-sectional views of under-display specular reflection fingerprint readers in accordance with various embodiments.
Figure 15B:
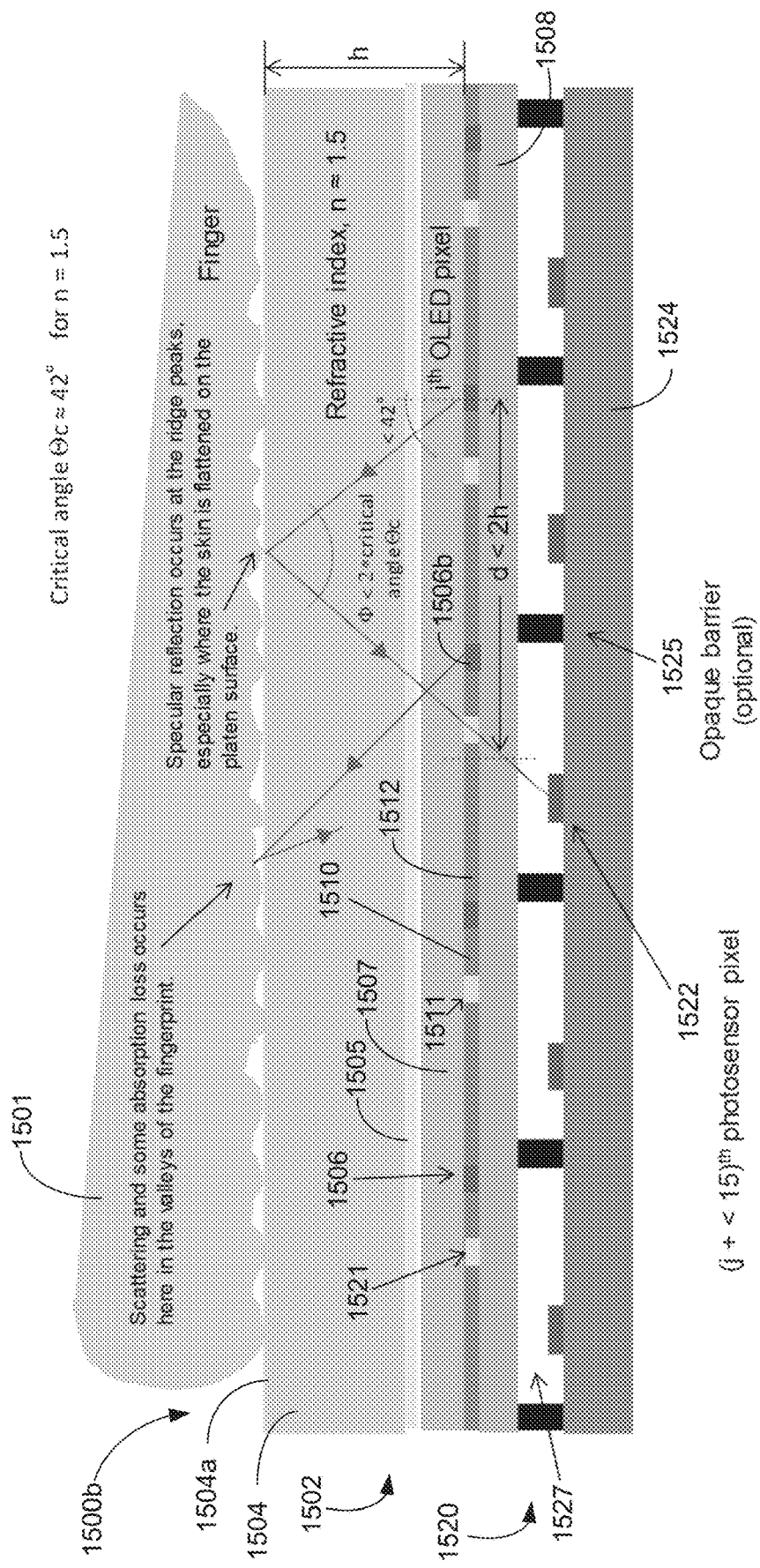

FIGS. 15A and 15B are cross-sectional views of under-display specular reflection fingerprint readers in accordance with various embodiments. The under-display specular reflection fingerprint readers 1500a and 1500b shown in FIGS. 15A and 15B are similar in configuration and functionality, but differ in terms of the configuration of the optical sensor as discussed below. The specular reflection fingerprint reader 1500a, 1500b includes a display 1502 optically coupled to an optical sensor 1520 via a pinhole array 1510. In the embodiments shown in FIGS. 15A and 15B, the pinhole array 1510 is integral to the display 1502. The display 1502 can be any of the displays described herein (e.g., AMOLED) or any other type of display that includes an array of illuminatable active pixels. The display 1502 can comprise a touch screen or be configured as a non-touch-sensitive screen.

Display 1502 includes a transparent cover 1504 (e.g., cover glass or plastic) which defines a contact surface 1504a of the specular reflection fingerprint reader 1500a, 1500b to which a finger 1501 can be applied. The transparent cover 1504 has a specified refractive index, such as about 1.5 (e.g., $n \approx 1.5$), and can have a thickness of about 0.5 mm (e.g., cover glass plus adhesive). The transparent cover 1504 is in contact with an optional polarizer 1505, which can have a thickness of about 50 μm. Active pixels 1506, preferably arranged as an array of active pixels 1506, are disposed on an opaque substrate 1512. As previously discussed, the active pixels 1506 are preferably green or blue emitters, such as green or blue OLED emitters. TFT glass 1508 is in contact with the substrate 1512. Encapsulating glass 1507 is disposed between the polarizer 1505/transparent cover 1504 and the array of active pixels 1506. It is understood that the component layers of the display 1502 can vary from those shown in FIGS. 15A and 15B, and that the particular component layers of the display 1502 represent non-limiting examples of constituent elements of a display that can be optically coupled to the optical sensor 1520 to define a specular reflection fingerprint reader apparatus of the present disclosure. For example, the display 1502 need not include the polarizer 1505.

In the embodiments shown in FIGS. 15A and 15B, the substrate 1512 is opaque and, therefore, blocks light reflecting from the contact surface 1504a from passing into the optical sensor 1520. Apertures or pinholes 1511 are provided in the substrate 1512 and arranged to define a pinhole array 1510. The pinhole array 1510 provided in the opaque substrate 1512 is arranged and functions similarly to the pinhole array 1410 shown in FIG. 14. A dielectric filling material or fill air 1521 is disposed within the pinholes 1511. As was previously discussed, the dielectric filling material 1521 preferably has a refractive index equivalent to or about the same as that of the transparent cover 1504 (e.g., $n \approx 1.5$). The encapsulating glass 1507 and the TFT glass 1508 can have a thickness of about 100 μm. The total thickness, h, of the display 1504 defined between the array of active pixels 1506 and a contact surface 1504a of the transparent cover 1504 is about 550 μm. As was discussed previously, the value of h, 2 h, D, n, or any other dimensions or parameters will vary depending on the particular design of the display 1502 and optical sensor 1520.

The optical sensor 1520 includes an array of photosensors 1522 disposed on a substrate 1524. The photosensors 1522 can take the form of any sensor which is sensitive to light, examples of which are discussed above. In some embodiments, dielectric filling material or fill air 1527 can be disposed between the TFT glass 1508 and the substrate 1524. The dielectric filling material 1527 preferably has a refractive index equivalent to or about the same as that of the transparent cover 1504 (e.g., $n \approx 1.5$). In the embodiment show in FIG. 15B, the optical sensor 1520 further includes an opaque barrier 1525 disposed between adjacent photosensors 1522. The opaque barriers 1525 are configured to optically isolate the photosensors 1522 from one another.

FIGS. 16A-16D are cross-sectional views of under-display specular reflection fingerprint readers in accordance with various embodiments. The under-display specular reflection fingerprint readers 1600a, 1600b, 1600c, and 1600d shown in FIGS. 16A-16D are similar in configuration and functionality, but differ in terms of the configuration of the optical sensor as discussed below. The under-display specular reflection fingerprint readers 1600a, 1600b, 1600c, 1600d include a display 1602 optically coupled to an optical sensor 1620 via a pinhole array 1610. The display 1602 can be implemented as any of the displays disclosed herein.

The display 1602 includes a transparent cover 1604 (e.g., cover glass or plastic) which defines a contact surface 1604a of the specular reflection fingerprint reader apparatuses 1600a, 1600b, 1600c, 1600d to which a finger 1601 can be applied. The transparent cover 1604 has a specified refractive index, such as about 1.5 (e.g., n≈1.5). The transparent cover 1604 can have a thickness of about 0.5 mm (e.g., cover glass plus adhesive). The transparent cover 1604 is in contact with an optional polarizer 1605, which can have a thickness of about 50 μm. Active pixels 1606, preferably arranged as an array of active pixels 1606, are disposed on TFT glass 1608. The TFT glass 1608 serves as a transparent substrate upon which the active pixels 1606 are disposed. Encapsulating glass 1607 is disposed between the polarizer 1605/transparent cover 1604 and the array of active pixels 1606. It is understood that the component layers of the display 1602 can vary from those shown in FIGS. 16A-16D, and that the particular component layers of the display 1602 shown in FIGS. 16A-16D represent non-limiting examples of constituent elements of a display that can be optically coupled to the optical sensor 1620 to define a specular reflection fingerprint reader apparatus of the present disclosure. For example, the display 1602 may exclude the polarizer 1605.

A dielectric filling material or fill gas (e.g., air) 1621 is disposed between adjacent active pixels 1606 and fills the void between the encapsulating glass 1607 and the TFT glass 1608. The dielectric filling material or fill gas 1621 has a refractive index equivalent to or about the same as that of the transparent cover 1604 (e.g., n≈1.5). The encapsulating glass 1607 and the TFT glass 1608 can have a thickness of about 100 μm. The total thickness, h, of the display 1604 defined between the array of active pixels 1606 and a contact surface 1604a of the transparent cover 1604 is about 550 μm.

The optical sensor 1620 includes an array of photosensors 1622 disposed on a substrate 1624. The photosensors 1622 can take the form of any sensor which is sensitive to light. For example, the array of photosensors 1622 can be implemented as an array of photodiodes. In other embodiments, the array of photosensors 1622 can be implemented as any other indexable, readable array of photosensitive pixels, such as a CMOS sensor or a CCD sensor. The optical sensor 1620 shown in FIGS. 16A and 16B includes dielectric filling material or fill gas 1621 disposed between adjacent photosensors 1622 and fills the void between the TFT glass 1608 and the substrate 1624. The dielectric filling material or fill gas 1621 of the optical sensor 1620 has a refractive index equivalent to or about the same as that of transparent material of the display 1604 (e.g., n≈1.5). It is noted that the dielectric filling material 1621 can be an optical cement, an optical adhesive, air or other refractive index matching material. The optical sensor 1620 shown in FIGS. 16C and 16D includes fill air 1627 provided between adjacent photosensors 1622 and fills the void between the TFT glass 1608 and the substrate 1624.

The pinhole array 1610 is affixed (e.g., via an adhesive) to the surface of the TFT glass 1608 facing the array of photosensors 1622. The pinhole array 1610 includes an array of pinholes 1611, each of which is filled with dielectric filling material or fill gas 1621. The pinhole array 1610 can be a pinhole mask comprising black chrome deposited on a substrate with an array of holes provided therethrough. The pinhole mask can be adhesively applied directly to the surface of the TFT glass 1608 that faces the array of photosensors 1622.

FIGS. 16A-16D (and FIG. 17) show a finger 1601 applied to the contact surface 1604a of the transparent cover 1604. The flat, relatively smooth tops of the fingerprint ridges have good specular reflectivity, while the valleys cause scattering of the light rays. Scattering and some absorption loss occurs in the valleys of the fingerprint, while specular reflection occurs at the ridge peaks, especially where the skin is flattened on the contact surface 1604a. This makes the ridge tops appear bright, and the valleys appear dark when imaged by an imaging device (coupled to the photosensors 1622) of the specular reflection fingerprint reader 1600a, 1600b, 1600c, 1600d. Because shorter optical wavelengths penetrate the skin less, using green or blue illumination can improve the performance of the specular reflection contrast detection mechanism for a fingerprint reader versus longer wavelengths (e.g., red illumination).

As is shown in FIGS. 16A-16D (and FIG. 17), the active pixels 1606 are spaced apart from one another, typically with a fixed spacing provided between adjacent active pixel 1606. The pinhole array 1610 includes an array of pinholes 1611 spaced apart from one another, typically with a fixed spacing provided between adjacent pinholes 1611. The photosensors 1622 are spaced apart from one another, typically with a fixed spacing provided between adjacent photosensors 1622. According to various embodiments, the pinholes 1611 of the pinhole array 1610 are offset from the photosensors of the photosensor array 1622. In some embodiments, the pinhole array 1610 has the same pitch as the photosensor array 1622. Typically, the pinholes 1611 in the pinhole array 1610 are offset in one dimension. In this arrangement, the pinhole array 1610 is configured to collimate the reflected light rays to preferentially select light rays passing at an angle greater than or equal to the critical angle, $\Theta_c$, such that the selected light rays are communicated to the photosensors 1622. In some embodiments, the array of active pixels 1606 is offset from the pinhole array 1610, both of which are offset from the array of photosensors 1622 in one dimension. The active pixels 1606 can have a size of about 50 μm, and the corresponding pinhole array pitch can also be about 50 μm.

As was previously discussed with reference to FIGS. 1 and 2, a processor is coupled to the display 1604 and the optical sensor 1620 and configured to control reading of signals from the photosensors 1622 and to control illumination of selected active pixels 1606 in accordance with a predefined scanning pattern. For example, and in the case of an OLED array of active pixels 1606, the processor can implement a predefined scanning pattern that sequentially turns on only the $i^{th}$ row of active pixels 1606a to emit light, while simultaneously reading signals only from the $(i+n)^{th}$ row of photosensor 1622a, where n is an integer up to about 15.

The signals acquired from the $(i+n)^{th}$ row of photosensors 1622a, when processed by image processing software implemented by the processor, represents a partial image (e.g., a frame) of the total fingerprint image. The processor repeats this scanning procedure until all of the rows of active pixels 1606 have been selectively activated for the finger sensing region of the transparent cover 1604. As will be described below, the row by row pixel activation scanning pattern described above represents one of a large number of predetermined scanning patterns that can be implemented by the processor.

Figure 16A:
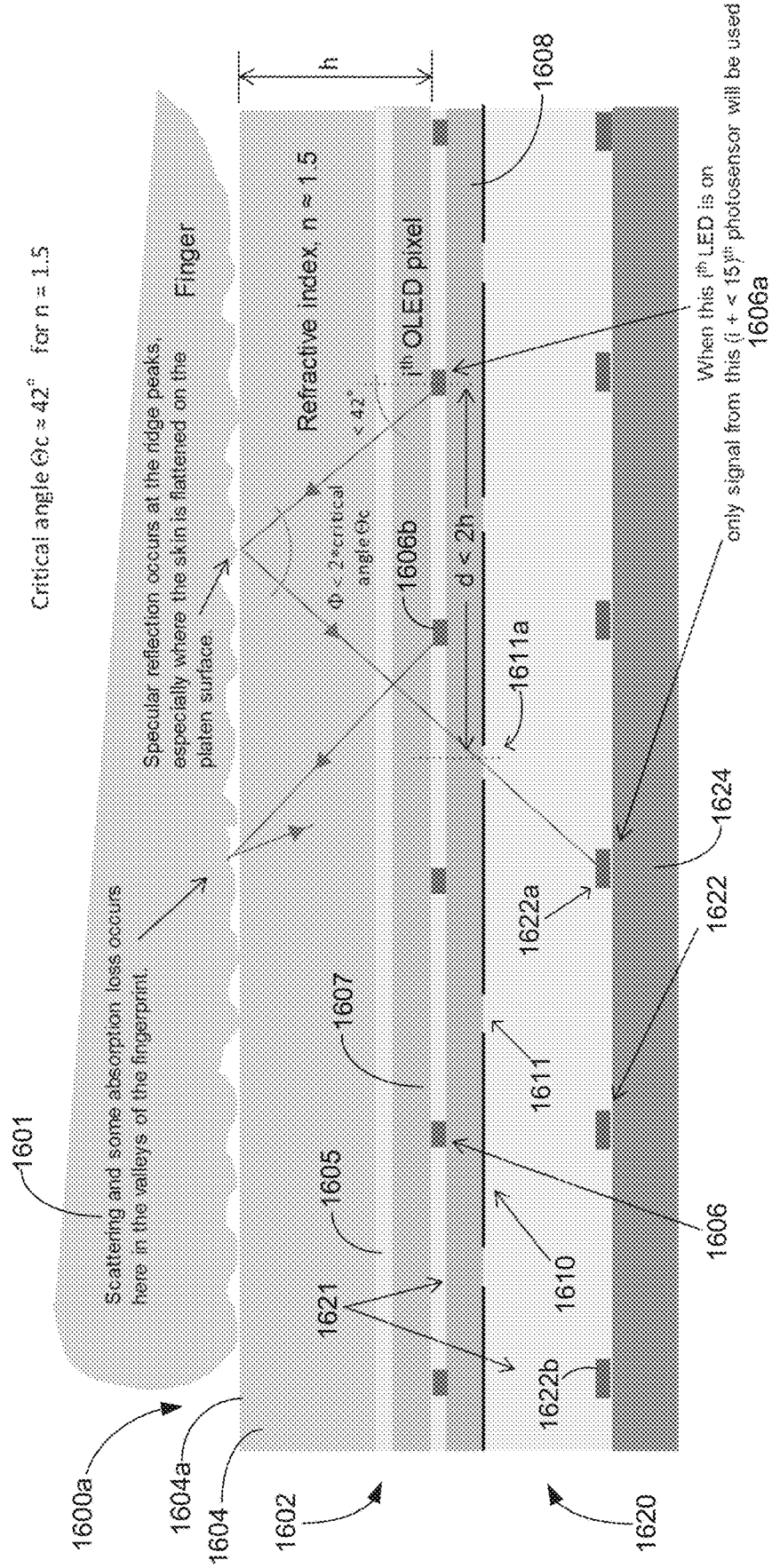
FIG. 16A is a cross-sectional view of an under-display specular reflection fingerprint reader in accordance with various embodiments.

With further reference to FIG. 16A, the spacing between and activated pixel 1606a and its corresponding pinhole 1611a and photosensor 1622a is related to the thickness, h, of the display 1604 defined between the array of active pixels 1606 and the contact surface 1604a of the transparent cover 1604. In the representative example provided above, light emitted by a selected $i^{th}$ active pixel 1606a (e.g., a row of active pixels) illuminated by the processor is detected by an $(i+n)^{th}$ photosensor 1622a (e.g., a row of photosensors), wherein n represents the number of photosensors 1622 spaced apart from the selected i$^{th}$ active pixel by a distance d<2 h. The value 2 h is based on a reflection angle of 45 degrees, which in turn works only for the glass having a refractive index of ≥1.414. It is understood that the value of d is based on the particular reflection angle for a particular fingerprint reader design. The processor is configured to read a signal from the (i+n)$^{th}$ photosensor 1622a (e.g., signals from the row of photosensors). The processor can then generate a partial image of the fingerprint using the signal from the (i+n)$^{th}$ photosensor 1622a (e.g., signals from the row of photosensors).

By way of example, and in the case of an OLED array of active pixels 1606, assume h≈600 μm, then 2 h~1200 μm, where, h, is the thickness of the display 1602 defined between the array of active pixels 1606 and the contact surface 1604a of the transparent cover 1604 of the display 1602 where a finger 1601 is placed. For the specular reflection contrast detection mechanism to work properly, due to the dielectric fill material or gas 1621 in various embodiments, the distance, d, between an active pixel 1606a and its corresponding photosensor 1622a is characterized by d<2 h, which corresponds to d≤15 rows when implementing an auto scanning methodology. In general, auto scanning works by sequentially turning on only the i$^{th}$ row of pixels 1606 to emit light, while activating only the (i+<15)$^{th}$ row of photosensors 1622 simultaneously.

Figure 16B:
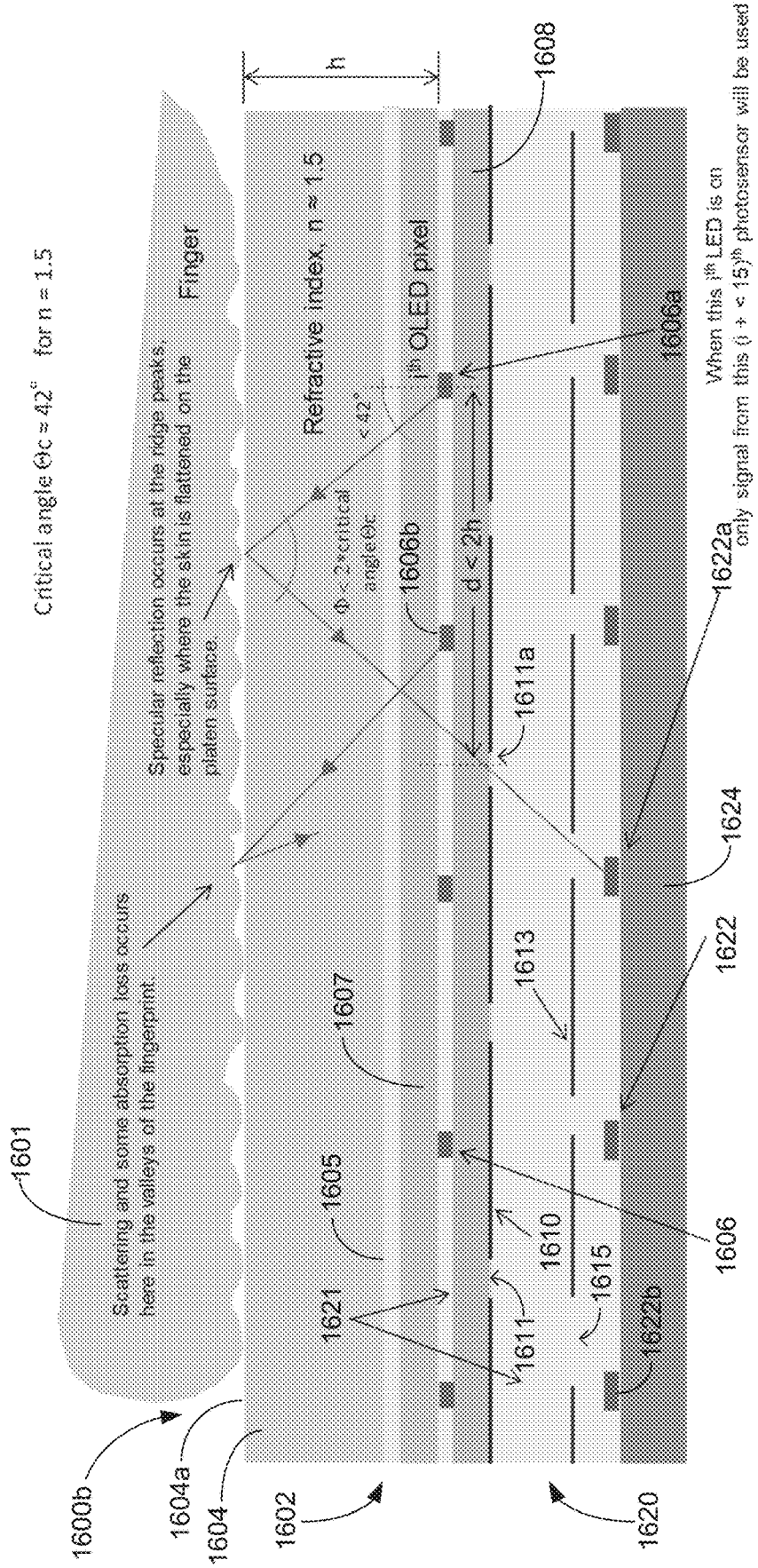
FIG. 16B is a cross-sectional view of an under-display specular reflection fingerprint reader in accordance with various embodiments.

The specular reflection fingerprint reader 1600b shown in FIG. 16B is substantially the same as that shown in FIG. 16A, but includes an additional pinhole array 1613, also referred to as a pinhole mask. A second pinhole array 1613 comprising an array of pinholes 1615 is positioned within the dielectric filling material 1621 of the optical sensor 1620 between the first pinhole array 1610 and the array of photosensors 1622. The array of second pinholes 1615 are offset from the first pinholes 1611 and the array of photosensors 1622 in the same direction that the first pinhole array 1610 was offset. The addition of the second pinhole array 1613 serves to further collimate the reflected light rays to preferentially select rays at an angle greater than or equal to critical angle, $\Theta_c$, such that the selected light rays are communicated to the photosensors 1622.

Figure 16C:
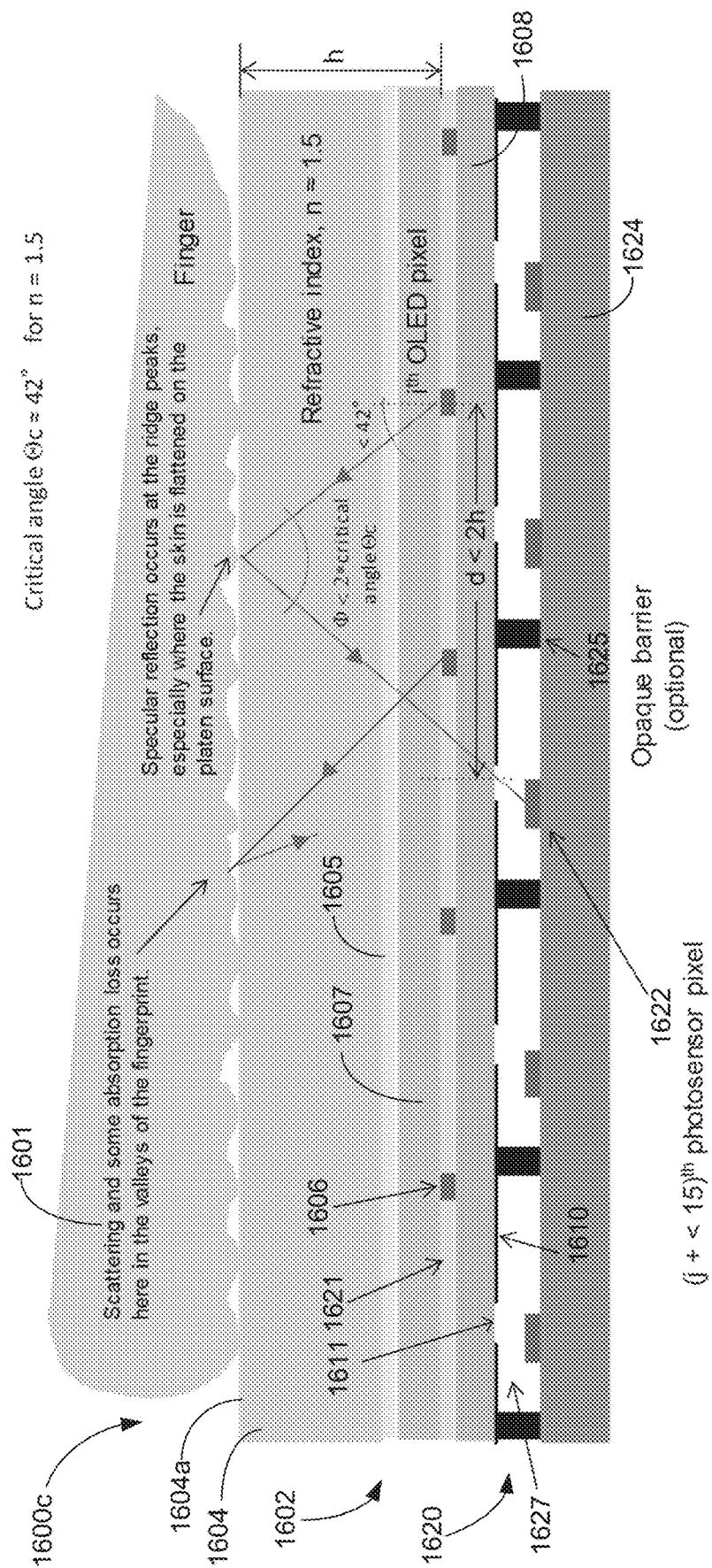
FIG. 16C is a cross-sectional view of an under-display specular reflection fingerprint reader in accordance with various embodiments.

The specular reflection fingerprint reader 1600c shown in FIG. 16C is substantially the same as that shown in FIG. 16A, but includes an opaque barrier 1625 disposed between adjacent photosensors 1622. The opaque barriers 1625 are configured to optically isolate the photosensors 1622 from one another.

Figure 16D:
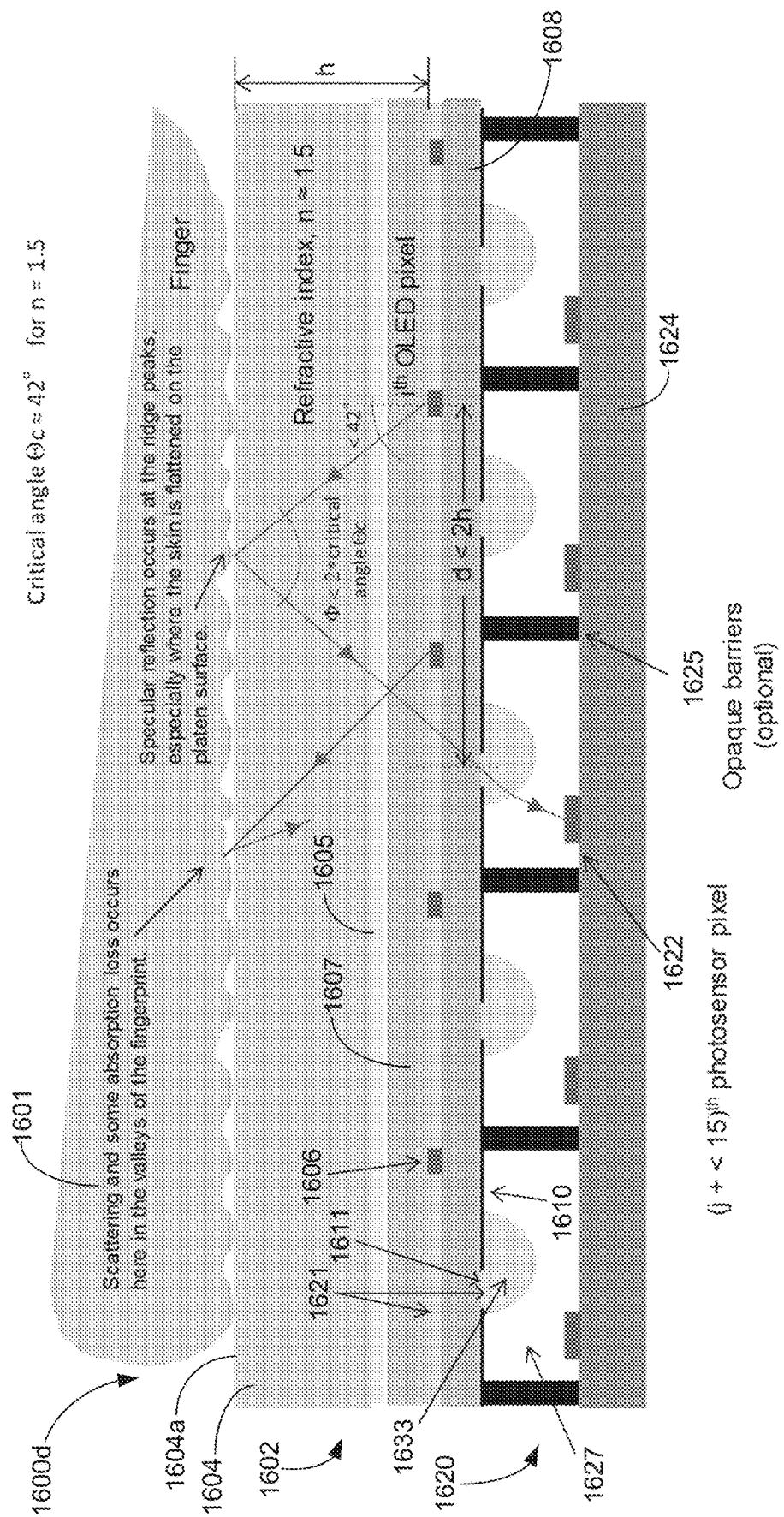
FIG. 16D is a cross-sectional view of an under-display specular reflection fingerprint reader in accordance with various embodiments.

The specular reflection fingerprint reader 1600d shown in FIG. 16D is substantially the same as that shown in FIG. 16C, but includes an array of microlenses 1633 similar to the microlenses 533 shown in FIG. 5B. The optical sensor 1620 shown in FIG. 16D includes an array of microlenses 1633 disposed between the pinhole array 1610 and the photosensor array 1622. Each of the photosensors 1622 has an associated microlens 1633. The microlenses 1633 can be spherical lenses or cylindrical lenses. The array of microlenses 1633 collect and help direct reflected light that passes through the apertures 1611 of the pinhole array 1610 onto the photosensors 1622.

In some embodiments, dielectric filling material or gas 1627 can be provided between the microlenses 1633 and the photosensors 1622. The dielectric filling material or gas 1627 can have same or different refractive index than the transparent material (e.g., glass or plastic of the transparent cover 1604) and other dielectric filling material/gas 1621 of the display 1602 and optical sensor 1620. For example, the dielectric filling material or gas 1627 can have a different, most likely lower, refractive index than the transparent material (e.g., glass or plastic of the transparent cover 1604) and other dielectric filling material/gas 1621 of the display 1602 and optical sensor 1620. The value of the refractive index difference between the transparent cover 1604 and dielectric filling material/gas 1621 of the display 1602 and the dielectric filling material/gas 1627 between the microlenses 1633 and photosensors 1622 will determine the shape (optimal focal length) of the microlenses 1633.

The microlenses 1633 are formed from a transparent material (glass or plastic) having a refractive index equivalent to or about the same as transparent material of the display 1602 (e.g., n≈1.5) and the dielectric filling material/gas 1621. In the embodiment shown in FIG. 16D, the optical sensor 1620 includes an opaque barrier 1625 (optional) disposed between adjacent photosensors 1622, which serve to optically isolate the photosensors 1622 from one another.

Figure 17:
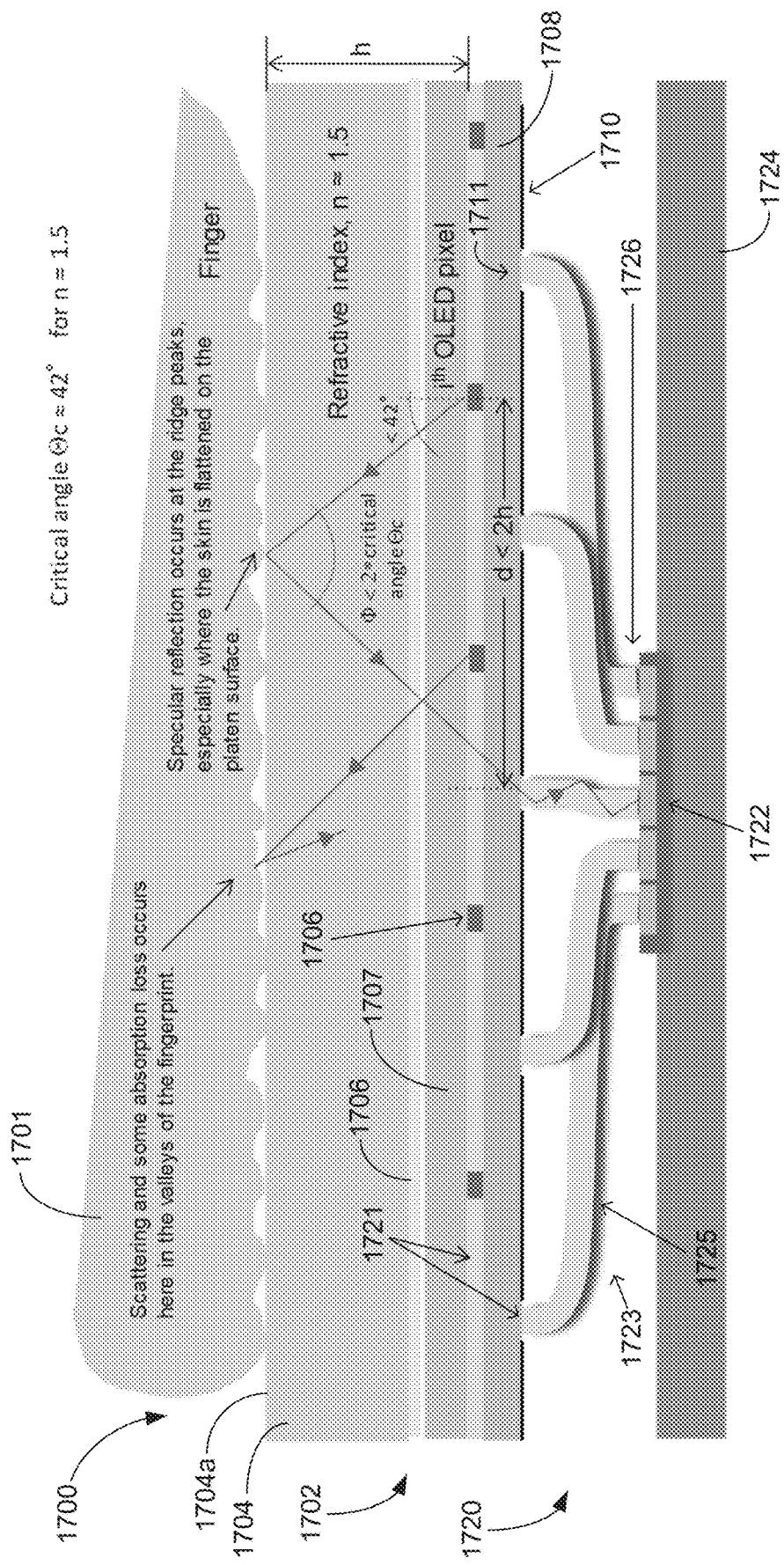
FIG. 17 is a cross-sectional view of an under-display specular reflection fingerprint reader in accordance with various embodiments.

FIG. 17 is a cross-sectional view of an under-display specular reflection fingerprint reader in accordance with various embodiments. The under-display specular reflection fingerprint reader 1700 shown in FIG. 17 is similar in configuration and functionality to the optical fingerprint reader 600 shown in FIG. 6, but differs in terms of the configuration of the optical sensor as discussed below. The under-display specular reflection fingerprint reader 1700 includes a display 1702 optically coupled to an optical sensor 1720 via a pinhole array 1710. The display 1702 can be implemented as any of the displays disclosed herein. The display 1702 can comprise a touch screen or be configured as a non-touch-sensitive screen.

Display 1702 includes a transparent cover 1704 (e.g., cover glass or plastic) which defines a contact surface 1704a of the specular reflection fingerprint reader apparatus 1700 to which a finger 1701 can be applied. The transparent cover 1704 has a specified refractive index, such as about 1.5 (e.g., n≈1.5). The transparent cover 1704 can have a thickness of about 0.5 mm (e.g., cover glass plus adhesive). The transparent cover 1704 is in contact with a polarizer 1705 (optional), which can have a thickness of about 50 μm. Active pixels 1706, preferably arranged as an array of active pixels 1706, are disposed on TFT glass 1708. The TFT glass 1708 serves as a transparent substrate upon which the active pixels 1706 are disposed. Encapsulating glass 1707 is disposed between the polarizer 1705/transparent cover 1704 and the array of active pixels 1706. It is understood that the component layers of the display 1702 can vary from those shown in FIG. 17, and that the particular component layers of the display 1702 shown in FIG. 17 represent non-limiting examples of constituent elements of a display that can be optically coupled to the optical sensor 1720 to define an specular reflection fingerprint reader apparatus of the present disclosure.

A dielectric filling material 1721 is disposed between adjacent active pixels 1706 and fills the void between the encapsulating glass 1707 and the TFT glass 1708. The dielectric filling material 1721 has a refractive index equivalent to or about the same as that of the transparent cover 1704 (e.g., n≈1.5) to minimize internal reflections at dielectric interfaces. The encapsulating glass 1707 and the TFT glass 1708 can have a thickness of about 100 μm. The total thickness, h, of the display 1704 defined between the array of active pixels 1706 and a contact surface 1704a of the transparent cover 1704 can be about 550 μm.

The pinhole array 1710 shown in FIG. 17 is affixed (e.g., via an adhesive) to the surface of the TFT glass 1708 facing an array of photosensors 1722. Alternatively, the pinhole array 1710 can be integrated into an opaque substrate that supports the active pixels 1706 (see, e.g., display 1504 and pinholes 1511 in substrate 1512 shown in FIGS. 15A and 15B). The pinhole array 1710 includes an array of pinholes 1711, each of which can be filled with dielectric filling material 1721. The pinhole array 1710 can be a pinhole mask comprising black chrome deposited on a substrate with an array of holes provided therethrough. The pinhole mask can be adhesively applied directly to the surface of the TFT glass 1708 that faces the array of array of photosensors 1722. The pinhole array 1710 serves to collimate light rays reflected by the contact surface 1704*a* to preferentially select rays at an angle greater than or equal to critical angle, $\Theta_c$, such that the selected light rays are communicated to the array of photosensors 1722.

The optical sensor 1720 includes a fiber-optic taper 1723 comprising individual component fibers 1725. Each of the component fibers 1725 is optically coupled to one of the pinholes 1711 and one of the photosensors of the photosensor array 1722. The individual component fibers 1725 couple light passing through individual pinholes 1711 of the pinhole array 1710 to individual photosensors of the photosensor array 1722. The fiber-optic taper 1723 can be optically coupled to the photosensor array 1722 via optical index matching material (e.g., optical cement) or some other coupling medium (e.g., gas or air). In some embodiments, the photosensor array 1722 can be implemented as an array of photodiodes. In other embodiments, the array of photosensors 1722 can be implemented as any other indexable, readable array of photosensitive pixels, such as a CMOS sensor or a CCD sensor.

The fiber-optic taper 1723 provides for a one-to-one mapping of pinholes 1711 to pixels in the photosensor array 1722. According to some embodiments, the fiber-optic taper 1723 is configured to reduce the pitch of the pinhole array 1710 down to a size that matches the size of the photosensors 1722. For example, the size of the active pixel 1706 (e.g., OLED pixel) and corresponding pinhole array pitch can be 50 μm, but the pixel size in the photosensor array 1722 can be 5 μm. In this illustrative example, a 10-to-1 reduction fiber-optic taper 1723 can be used to couple each individual pinhole 1711 to an individual pixel in the photosensor 1722.

The optical fingerprint reader apparatuses shown in FIGS. 14, 15A-15B, 16A-16D, and 17 rely on specular reflection for their primary contrast detection mechanism. The specular reflection contrast detection embodiments shown in FIGS. 14, 15A-15B, 16A-16D, and 17 provide for a spacing, d, between an activated pixel (e.g., pixel 1606*a*) and its corresponding pinhole (e.g., pinhole 1611*a*) and photosensor (e.g., photosensor 1622*a*). This spacing, d, is related to the thickness, h, of the display defined between the array of active pixels and the contact surface of the transparent cover of the display where a finger is placed. In the specular reflection embodiments shown in FIGS. 14, 15A-15B, 16A-16D, and 17, the spacing, d, is generally shown as a value less than 2 h (e.g., d<2 h). It is understood that the value of d is based on the particular reflection angle for a particular fingerprint reader design, and that the value of h, 2 h, d, n (refractive index), or any other dimensions or parameters will vary depending on the particular design of the display and optical sensor.

The under-display specular reflection fingerprint reader apparatuses disclosed herein enable a number of new use cases for authentication, many of which are particularly significant for hand-held electronic devices. The following are a number of non-limiting examples. With the touch sensing area covering a large portion of a hand-held device, a user can touch the device display at any location to perform the authentication task. The disclose specular reflection fingerprint reader apparatuses can read simultaneous or sequential touches with multiple fingers (or multiple different body parts having epidermal ridges), which may be required to significantly increase the authentication accuracy. Fingerprint authentication can be combined with a pass code where the fingerprint is authenticated at every key press as the finger touches the display screen.

When launching an app on a hand-held electronic device, the fingerprint authentication process can be performed as the user presses the key. Therefore, a separate authentication step can be omitted. When using a mobile device, the fingerprint authentication process can be performed continuously in the background as the user operates the device, thereby continuously monitor the identity of the user. In applications with potential input from multiple users, the disclosed specular reflection fingerprint sensors can be used to identify each finger press to identify the individual users. In applications where multiple users may authenticate for access with a pass code from a key pad, the disclosed specular reflection fingerprint readers may be used to identify individual user who attempted to gain access.

In various embodiments, an under-display specular reflection fingerprint sensor can be incorporated in hand-held electronic devices such as mobile phones. The fingerprint sensor module can be fabricated to cover at least 50% of the lower portion of the device display, while the remaining upper portion of the display can be integrated with under-display cameras and sensors for the front-facing camera, face identification, and environmental sensing.

In one representative construction example, the specular reflection fingerprint sensor can be fabricated as a single assembly on a glass substrate. First, the light sensing layer is fabricated, preferably with TFT technology. The preferred pixel pitch is 25-200 micrometers. A passivation layer and spacing layer is deposited on top of the TFT layer, preferably made from transparent material, such as glass. An optical mask is fabricated on top of the spacing layer. Preferably, this optical mask can be a pinhole array or a fiber optic array arranged at an optimal angle of the reflected light rays. An optional spacing layer of glass is deposited on the optical mask. A light-emitting display layer is fabricated on top of the glass layer. A passivation glass layer with additional display features, such as polarizers, and sensing features, such as touch sensing layers, are fabricated on top of the glass layer.

Figure 18:
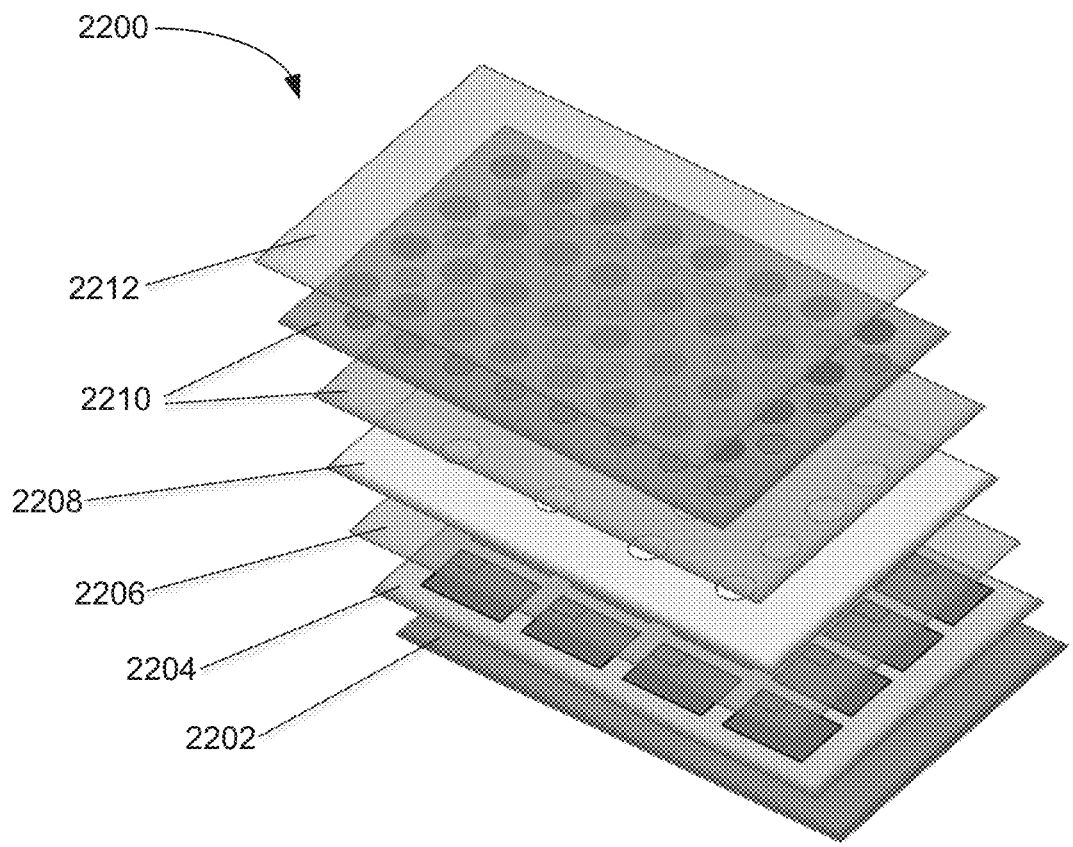
FIG. 18 shows a representative example of a unified fabrication approach using TFT technology for producing an under-display specular reflection fingerprint reader in accordance with various embodiments.

FIG. 18 shows an example of the representative example described above. The example shown in FIG. 18 is directed to a unified fabrication approach using TFT technology. FIG. 18 shows a unified assembly 2200 with photo-sensing, pinhole mask, and OLED emitters fabricated on single glass or amorphous silicon substrate. The unified assembly 2200 includes a plastic, glass or amorphous silicon substrate 2202 onto or over which a TFT photo-sensing and readout layer 2204 is disposed. A spacer 2206, such as an $SiO_2$ layer, is disposed on or over the TFT photo-sensing and readout layer 2204. A pinhole mask layer (e.g., metallization layer) 2208 is disposed on or over the spacer 2206. OLED display circuitry and emission layer 2210 is disposed on or over the pinhole mask layer 2208. Cover Glass and optional polarizer assembly 2212 is disposed on or over the OLED display circuitry and emission layer 2210.

Figure 19:
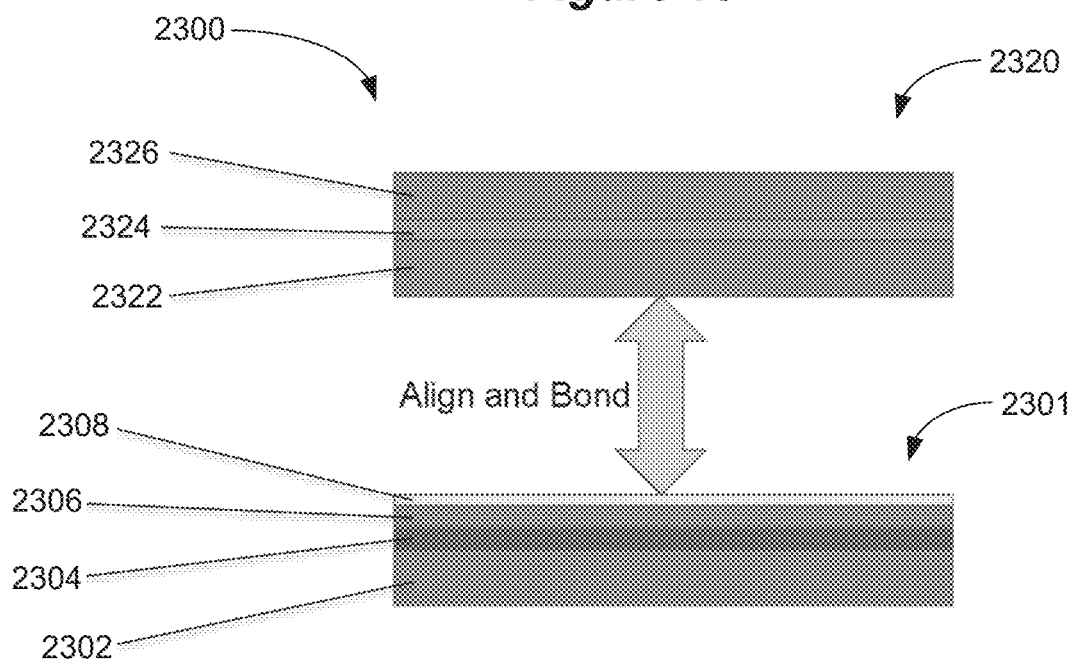
FIG. 19 shows a representative example of an integrated display assembly fabricated using a separate specular reflection optical sensor module which is aligned and bonded to a display in accordance with various embodiments.

In another representative construction example, and with reference to FIG. 19, a specular reflection fingerprint sensor 2301 is fabricated as a separate module and subsequently aligned and bonded to a display 2320, such as an OLED or AMOLED display, to create an integrated display assembly. The specular reflection fingerprint sensor 2301 includes a light sensing layer 2304 (e.g., TFT photo-sensing layer) disposed on or over a substrate 2302, such as an amorphous silicon or glass substrate, with a preferred pixel pitch of 25-200 micrometers. A passivation layer and spacing layer 2306 (e.g., glass, $SiO_2$) is disposed on or over the light sensor layer 2304. An optical mask layer 2308 (e.g., pinhole mask) is fabricated on or over the spacing layer 2306. This completes the specular reflection fingerprint sensor module 2301.

A conventional OLED or AMOLED display 2320 is fabricated or obtained, and the transparency is improved by materials in the display layers and optimizing the routing of the interconnects. The display 2320 includes an OLED emission layer 2324 disposed on or over a glass substrate 2322. Cover glass 2326 and optional polarizer layer is disposed on or over the OLED emission layer 2324.

Turning now to FIG. 7, there is illustrated a scanning pattern that can be implemented by a processor coupled to a specular reflection fingerprint reader of the present disclosure in accordance with various embodiments. FIG. 7 is a top view that shows two portions 700a and 700b of an AMOLED display 700. A cross-sectional view of the display 700 is shown in FIG. 7A. The display 700 includes an active pixel array 702 and an integral pinhole array 704 (see, e.g., FIG. 14). In this illustrative example, the pinholes (e.g., pinhole 704a) of the pinhole array 704 have a size of 25 μm. The pinhole array 704 allows light generated by the active pixel array 702 and reflected by a transparent cover of the display 700 to pass through to the photosensor array 706 of the optical sensor of the specular reflection fingerprint reader.

In this illustrative example, a processor of the specular reflection fingerprint reader is configured to control illumination of selected active pixels 702 and reading of signals from selected photosensors 706 in accordance with a predefined scanning pattern.

Automatic scanning implemented by the processor involves sequentially turning on only the $i^{th}$ row of active pixels 702a to emit light (e.g., green or blue light), while activating or reading signals only from the $(i+n)^{th}$ row of photosensors simultaneously. In this illustrative example, n is set at 15 rows, which corresponds to a separation distance, d, of about 1200 μm, which is less equal to 2 h (e.g., d<2 h), where h represents the thickness of the display defined between an exterior surface of the transparent cover and the active pixel array 702. This predefined scanning pattern allows only light that can participate in the specular reflection process to be detected by the photosensor array 706, thereby producing good contrast for detecting ridges versus valleys of a user's finger. According to various embodiments, the width of each row of illuminated active pixels 702 and corresponding pixels of the photosensor array 706 preferably corresponds to the width of the finger sensing region of the display's transparent cover. It is noted that the processor may also turn on the $(i-n)^{th}$ row of photosensors in addition to turning on the $(i+n)^{th}$ row of photosensors. By doing so, the processor can speed up the data acquisition process, assuming that the light from the illuminated active pixels diverges outward symmetrically.

Figures 8A, 8B:
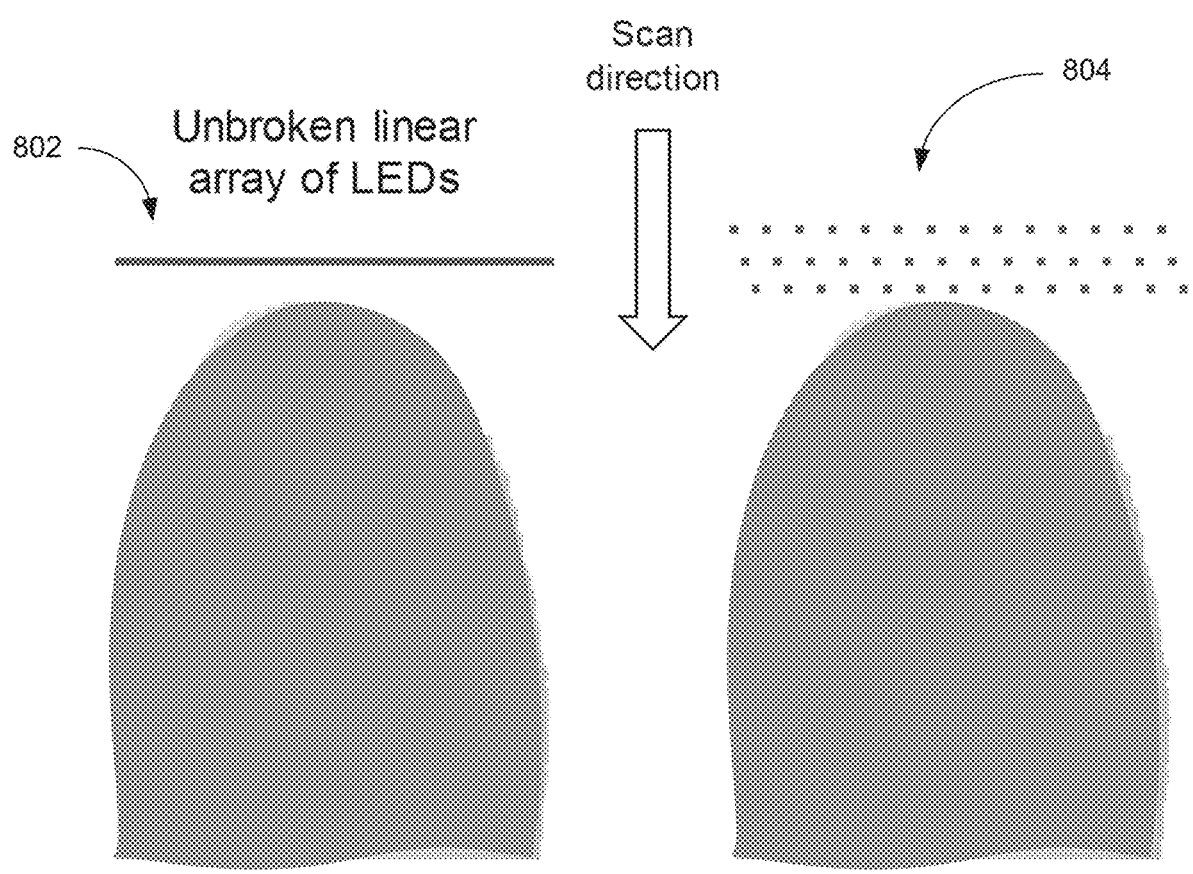
FIG. 8A illustrates a scanning illumination pattern comprising an unbroken linear array of illuminated active pixels in accordance with various embodiments.
FIG. 8B illustrates a scanning pattern comprising a decimated and offset array of illuminated active pixels in accordance with various embodiments.

The use of various different illumination scanning patterns can enhance both resolution and contrast, depending on the exact design of the optical system. FIGS. 8A and 8B illustrate different illumination scanning patterns that can be implemented by a processor of a specular reflection fingerprint reader in accordance with various embodiments. FIG. 8A illustrates a relatively simple scanning illumination pattern 802 comprising an unbroken linear array of active pixels. Depending on the design of the optical system, illumination of adjacent pixels can reduce resolution or contrast.

FIG. 8B illustrates an alternate scanning pattern 804 that can improve contrast and resolution relative to the scanning pattern 802 shown in FIG. 8A. The scanning pattern 804 shown in FIG. 8B comprises a decimated and offset array of active pixels. It can be seen in FIG. 8B that the decimated rows of illuminated active pixels provides for an illuminated active pixel to be surrounded by one or more non-illuminated active pixels in two dimensions. It is noted that, when adjacent active pixels are used as in the simple straight line array shown in FIG. 8A, there can be crosstalk between light rays reflecting from adjacent points on the finger, while entering the same photosensor. By offsetting adjacent illumination points vertically, light rays emanating from those active pixels will either arrive at the wrong angle, or at a different time, depending on what point on the finger they impinge, and will therefore not degrade the resolution or contrast of the active pixel sensors during the scan.

In some embodiments, the predefined scanning pattern defines an arrangement of illuminated active pixels having a constant shape that is shifted by the processor in a step-wise manner to cover the finger sensing region of the transparent cover. In other embodiments, the predefined scanning pattern defines an arrangement of illuminated active pixels having a shape that is changed and shifted by the processor in a step-wise manner to cover the finger sensing region of the transparent cover. The predefined scanning pattern can define one or more rows of illuminated active pixels. For example, the predefined scanning pattern can define one or more decimated rows of illuminated active pixels, an example of which is shown in FIG. 8B. The predefined scanning pattern can define a polygonal pattern spanning a plurality of rows of illuminated active pixels. The predefined scanning pattern can define a curvilinear pattern spanning a plurality of rows of illuminated active pixels. In some implementations, the predefined scanning pattern can define a combination of the same or different patterns, such as a combination of polygonal and curvilinear patterns spanning a plurality of rows of illuminated active pixels.

Figure 9:
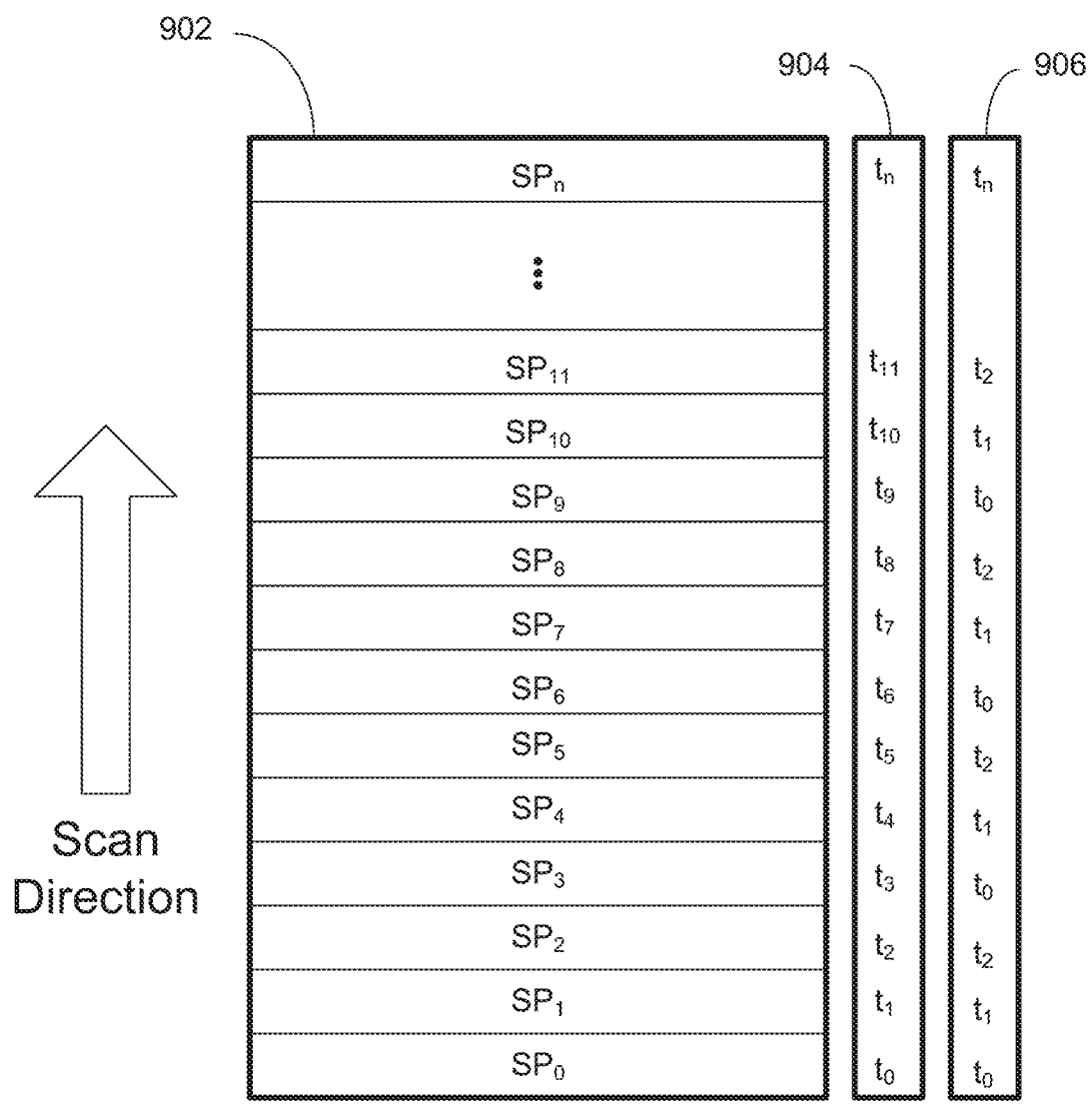
FIG. 9 illustrates a finger sensing region of an optical fingerprint reader which is subject to scanning in accordance with a predefined scanning pattern and different timing tables in accordance with various embodiments.

FIG. 9 illustrates a finger sensing region 902 of a specular reflection fingerprint reader which is subject to scanning in accordance with a predefined scanning pattern. Scanning of a user's finger begins at time to with the scanning pattern at position 0 ($SP_0$) and proceeds in a step-wise manner in the indicated scanning direction until the scanning pattern at position n ($SP_n$) is reached at time $t_n$. The scanning pattern can be activated and shifted in a variety of ways, two of which are illustrated by timing tables 904 and 906. Timing table 904 represents a relatively simple manner of controlling the scanning pattern. According to timing table 904, the scanning pattern at scanning position 0 ($SP_0$) is illuminated by the processor at time $t_0$. The processor reads signals from corresponding photosensors (e.g., separated from the illuminated pixels by n rows of pixels), and generates a partial fingerprint image using the photosensor signals. The processor shifts the scanning pattern sequentially from scanning position 1 ($SP_1$) through scanning position n ($SP_n$) in temporal order at each of times $t_1$ through $t_n$. At each time increment, the processor reads signals from corresponding photosensors, and generates a partial fingerprint image using the photosensor signals. At the conclusion of the scanning process, the processor executes image processing software to generate a complete fingerprint image from the partial fingerprint images.

Timing table 906 represents a manner of controlling the scanning pattern at an increased speed relative to that achieved using timing table 904. Using timing table 906, the processor illuminates the scanning pattern at multiple scanning positions simultaneously. For example, at time $t_0$, the processor activates the scanning pattern at scanning positions 0 ($SP_0$), 3, ($SP_3$), 6 ($SP_6$), 9 ($SP_9$), etc. At time $t_1$, the processor activates the scanning pattern at scanning positions 1 ($SP_1$), 4, ($SP_4$), 7 ($SP_7$), 10 ($SP_{10}$), etc. At time $t_2$, the processor activates the scanning pattern at scanning positions 2 ($SP_2$), 5, ($SP_5$), 8 ($SP_8$), 11 ($SP_{11}$), etc. The processor activates the scanning pattern for the remaining positions until all remaining positions have been processed. At each time increment, the processor reads signals from corresponding photosensors, and generates partial fingerprint images using the photosensor signals. At the conclusion of the scanning process, the processor executes image processing software to generate a complete fingerprint image from the partial fingerprint images.

In some embodiments, the scanning pattern at each of the scanning positions shown in FIG. 9 is the same active pixel illumination pattern (e.g., a static scanning pattern), such as the decimated multiple row pattern shown in FIG. 8B. In other embodiments, the shape of scanning pattern can vary from one scanning position to another. In this case, the scanning pattern can be considered dynamic, in that the scanning pattern can be changed to by the processor from one scanning position to another.

Figure 10A:
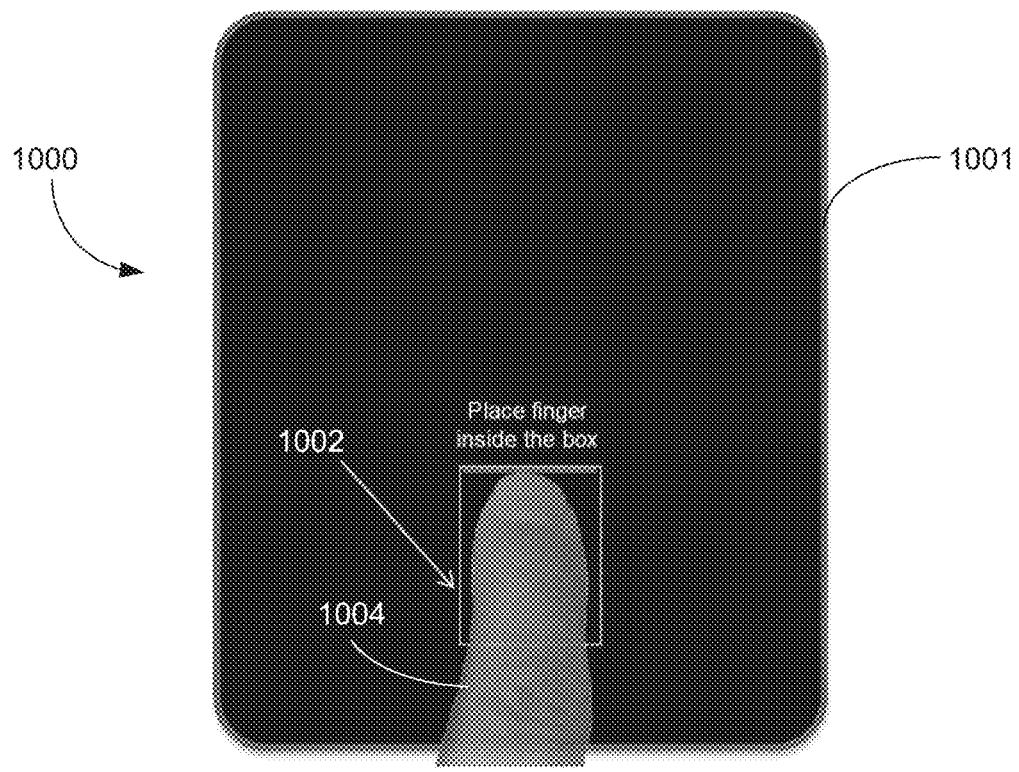
FIGS. 10A and 10B illustrate a mobile communication device which incorporates an optical fingerprint reader apparatus in accordance with various embodiments, the device including a display configured to present a finger sensing region for performing a fingerprint reading operation.
Figure 10B:
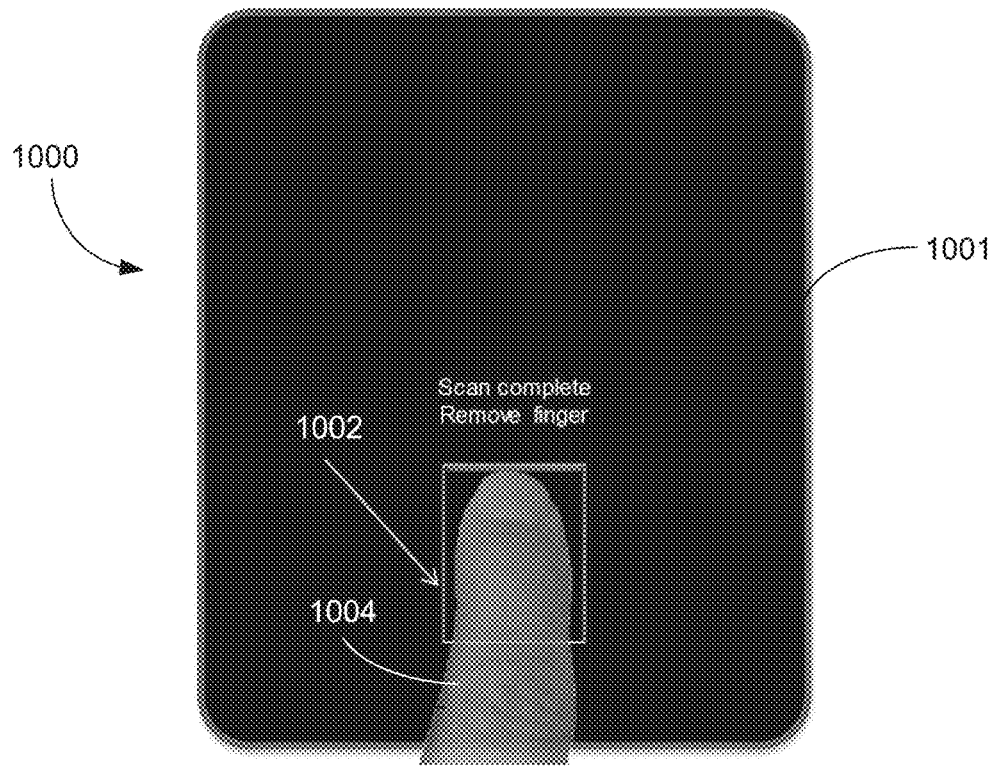

FIGS. 10A and 10B illustrate a mobile communication device 1000 (e.g., mobile phone, tablet, phablet) which incorporates a specular reflection fingerprint reader apparatus in accordance with various embodiments. The mobile communication device 1000 includes a display 1001, which can be implemented in accordance with any of the displays disclosed herein. The display 1001 incorporates or is disposed above a specular reflection sensor (not shown), which can be implemented in accordance with any of the specular reflection sensors disclosed herein. The combination of the display 1001 and specular reflection sensor integral to or positioned below the display 1001 defines a specular reflection fingerprint reader apparatus in accordance with various embodiments. In some embodiments, the display 1001 comprises a touch sensor, which can be implemented using various touch sensing technologies as previously discussed. In other embodiments, the display 1001 is a non-touch-sensitive display.

The display 1001 shown in FIGS. 10A and 10B includes a finger sensing region 1002. In some embodiments, the mobile communication device 1000 incorporates a partial-screen specular reflection fingerprint reader apparatus. In such embodiments, the finger sensing region 1002 is operative for fingerprint reading at a predefined fixed location of the display 1001. In other embodiments, the mobile communication device incorporates a full-screen specular reflection fingerprint reader apparatus. In such embodiments, the finger sensing region 1002 is operative for fingerprint reading at any location of the display 1001. For example, and in the context of a touch sensitive display 1001, a user can place his or her finger 1004 anywhere on the display 1001. In response to detecting the location of the touch on the display 1001, the finger sensing region 1002 is displayed and operative for fingerprint reading at the detected touch location on the display 1001. As such, the finger sensing region 1002 can be determined automatically by the touch-sensitive display 1001.

In FIGS. 10A and 10B, a single finger sensing region 1002 is shown for illustrative purposes. As was previously discussed, the specular reflection fingerprint reader apparatus can be configured to include a multiplicity of finger sensing regions 1002 that provide for reading a fingerprint from a multiplicity of fingers 1004, sequentially or concurrently. The one or more finger sensing regions 1002 define a limited portion of the display's LED array and optical sensor centered around the location where the finger or fingers 1004 contact the display 1001. Using one or more predefined figure sensing regions 1002 advantageously saves time by not scanning the entire display 1001.

Many applications implemented by the mobile communication device 1000 require authentication of a user for security reasons. The mobile communication device 1000 can be configured to implement a fingerprint reading operation using the specular reflection fingerprint reader apparatus for any application that requires user authentication. For example, an authentication process implemented by the mobile communication device 1000 can provide instructions to a user (textual, graphical, and/or audible prompting) to guide the user through the authentication process. The authentication process can illuminate the finger sensing region 1002 on the display 1001 as a box and display text requesting that the user place his or her finger on the display 1001 within the finger sensing region 1002. It is noted that the finger sensing region 1002 is made large enough to image any user's fingerprint completely. The authentication process can then perform a fingerprint reading operation in a manner previously described.

In the case of a touch-sensitive display 1001, placement of the user's finger 1004 within the finger sensing region 1002 is detected by the touch screen sensors, which results in activation of the automatic scanning process. For example, the automatic scanning process can involve sequentially turning on selected rows of LEDs to emit light, while activating corresponding rows of photosensors below the display 1001 that are offset by the correct amount as previously described. Any of the previously described automatic scanning processes can be implemented during the fingerprint reading operation. Once the scanning operation is completed, the user is prompted to remove his or her finger 1004 from the display 1001, and the finger sensing region 1002 disappears from the display 1001. After completion of the fingerprint reading operation, the display 1001 returns to its normal mode of operation (e.g., normal touch screen mode). Advantageously, the specular reflection fingerprint reader apparatus does not interfere with any of the touch screen functionality of the display 1001.

According to various embodiments, and with reference to FIGS. 1 and 2, scanning software 150 can include calibration software executable by the processor 132. The calibration software is configured to adjust the offset between the illumination pixels of the display 102 and the photosensor pixels 122 of the optical sensor 120 depending on the thickness of the transparent cover 104, and whether or not a screen protector has been applied to the surface of the transparent cover 104 in order to optimize the fingerprint image quality and performance of the fingerprint reader. This is important because the optimal offset between an illumination pixel 122 and the associated photosensor 122 during the scanning process depends on the thickness of the transparent cover 104 plus the thickness of the screen protector. This offset may need to be changed by the processor 132 depending on the device type, and if a screen protector is added or removed.

One offset calibration process implemented by the processor 132 tests for optimal contrast during an iterative image scan by changing the offset on each iteration until the best offset is found. Another offset calibration process implemented by the processor 132 evaluates the total internally reflected image of a scanned row (or other pattern) of illuminator pixels 106 when there is no finger applied to the touch surface, and finds the offset that works best (e.g., peak brightness part of the image will fall into the photosensors 122 at the best offset location).

Calibrating the offset between illumination pixels 106 and associated photosensors 122 during the scanning process requires knowledge of the thickness of the transparent cover 104 and screen protector (if present). One approach involves manual input of the thickness parameters for the transparent cover 104 and screen protector. Glass thickness, for example, can be hard-coded or entered by the factory for the particular device. The thickness of the screen protector can be entered manually by the user or screen protector technician. In some embodiments, a special detection algorithm can be executed by the processor 132 to optimize the results automatically. For example, the thickness of the transparent cover 104 and screen protector (if present) can be automatically measured by execution of a thickness detection algorithm by the processor 132.

As previously discussed, the processor 132 is configured to execute image processing software 160 to construct a complete fingerprint image from photosensor data acquired during a fingerprint reading operation. In order to obtain a complete fingerprint image, a series of image frames taken as the illumination pattern is scanned is compiled by the processor 132 into a single image. The processor 132, when executing the image processing software 160, can be configured to pre-process each frame of photosensor data before the frames can be added or stitched together. The processor 132 may also be configured to post-process the complete fingerprint image before it is used for enrollment or authentication by the processor when executing the authentication software 170.

According to various embodiments, the processor 132 can be configured to execute some or all of the following pre-processing and/or post-processing operations. The processor 132 can be configured to execute program code of the image processing software 160 to perform all or some of the following pre-processing operations applied to individual frame images before compiling them into a full fingerprint image. The processor 132 can be configured to apply various filters to each frame. For example, the processor 132 can be configured to apply spatial filtering and cropping to cut off unwanted parts of the image of the image frame such as superfluous regions, or areas containing only background or noise. The processor 132 can be configured to apply frequency-domain filtering to either smooth or sharpen the image of the image frame. The processor 132 can be configured to perform linear scaling of the image of the image frame to adjust for variations in one or more dimension that may exist due to the exact sensor configuration being used. The processor 132 can be configured to perform non-linear scaling of the image "shape" of the image frame, such as correcting for the so-called keystone effect, or other non-uniform stretching or compression of the image dimensions.

The processor 132 can be configured to perform linear scaling of the brightness of the image of the image frame. The processor 132 can be configured to adjust the contrast of the image of the image frame. The processor 132 can be configured to apply a non-linear brightness scaling function to the image of the image frame, such as the gamma function used in photographic applications. The processor 132 can be configured to perform background subtraction to the image frame. Background subtraction may involve the acquisition of a complete series of image frames without a finger being placed on the display screen in order to store a set of background images that can be subtracted from the image frames on a frame-by-frame basis. The processor 132 can be configured to perform noise removal to the image frame, which can involve one or more of the numerous well-known noise removal algorithms such as outlier pixel suppression, median filters, etc.

After each image frame is pre-processed (e.g., cleaned up, scaled and otherwise processed to improve it), the image frames can be compiled, or assembled, to form the complete fingerprint image by the processor 132 executing post-processing program code of the image processing software 160. Because of the scanning illumination pattern, and the design of the data acquisition method, the image frames essentially each contain spatially distinct parts of the overall image, so the compilation process primarily involves adding all the individual image frames together as long as the spatial relationships of each individual frame has been preserved. If the spatial relationships of the frames have not been preserved due to some of the pre-processing steps or because of an approach to saving memory space during the data acquisition has been performed by the processor 132, then that spatial displacement of the individual frames may need to be reconstructed by the processor 132 as part of the compilation process to form the full fingerprint image. In that case, additional information about what portion of the overall image each frame corresponds to may need to be stored with each frame in the memory 140 so that its part of the overall fingerprint image can be inserted into the correct region of the 2-D space of the final, full fingerprint image.

After the initial compilation of the full fingerprint image is complete, the processor 132 can be configured to perform further post-processing of the full fingerprint image. The processor 132 can be configured to execute program code of the image processing software 160 to perform all or some of the following operations applied to the full fingerprint image. The processor 132 can be configured to perform some or all of the pre-processing operations discussed above on the full fingerprint image. The processor 132 can be configured to perform lossy image compression on the full fingerprint image. The processor 132 can be configured to perform lossless image compression on the full fingerprint image. The processor 132 can be configured to convert the full fingerprint image into a "template." For example, the processor 132 can be configured to perform a unidirectional transformation on the full fingerprint image to generate a fully fingerprint template, which can greatly reduce the amount of data stored and used for authentication of a user.

Various embodiments are directed to methods of performing a fingerprint reading operation using any of the fingerprint reader apparatuses disclosed herein. A representative fingerprint reading method involves sensing finger contact on the display or presenting a message to the user to place his or her finger on the display. The method involves activating the fingerprint sensor, and detecting the finger location on the display. The method involves clearing the finger sensing region of the display based on the detected finger location. The method involves starting the scanning pattern around the finger location, followed by running the scan and read out acquisition procedure. The method may involve pre-processing of individual frame images followed by assembling the full fingerprint images from the frames. The method may also involve further processing of the full fingerprint image if needed or desired. The method further involves running an authentication or enrollment procedure.

A specular reflection fingerprint reader apparatus in accordance with any of the embodiments disclosed herein provides a number of advantages not achievable using conventional fingerprint reading techniques. FIG. 20 is a table that summarizes some of these advantages. In addition to the advantages summarized in FIG. 20, a specular reflection fingerprint reader apparatus of the present disclosure uses specular reflection to provide an under-display fingerprint reader without a large prism by creating an auto-scanning design which uses an LED (e.g., OLED, AMOLED) display for illumination by sequentially illuminating selected pixels (e.g., selected rows) while capturing the reflected light by photosensors (e.g., a corresponding offset row of photosensors) placed below the screen.

Embodiments of the disclosure use the display LEDs for illumination, and add one or more very thin layers of material, as well as an array of photosensors. In addition, some embodiments incorporate masks, which are essentially an array of pinholes or slits, and micro-optical arrays such as a microlens array or a microprism array. By using masks, and scanning the illumination and sensor arrays, the fingerprint reader is much less susceptible to interference from external spurious light, such as bright sunlight.

Embodiments of the disclosure take advantage of the pixel control of the LEDs in the display screen, and use this capability to create a scanning illumination pattern that automatically scans during imaging of a fingerprint. This unique approach of using a scanning illumination pattern and synchronizing it with a corresponding scanned and offset array of photosensors for fingerprint imaging via specular reflection has a number of advantages, and can be configured in various ways to optimize the imaging performance. For example, this design allows a fingerprint reader to be integrated with the display, and still keep the overall thickness of the display very small, and well within the requirements of mobile phone and tablet makers. This design leverages the existing display for illumination, and minimizes the need for complex optics. This keeps the cost of the hardware relatively low.

By using specular reflection, an optical fingerprint reading apparatus of the present disclosure design produces high-contrast images of the fingerprint ridges directly, without the need for extensive post-processing to enhance a poor-contrast image. This also keeps computational cost to a minimum, and produces much better images for use with fingerprint recognition algorithms. Moreover, this design can easily be expanded in area to cover the entire screen, thereby making a full-screen fingerprint reader that can acquire the fingerprint image regardless of where the user places his or her finger.

In various embodiments, by using the touch sensing capability built into the touch screen itself, a full-screen version of the auto-scanning fingerprint reader can minimize fingerprint image acquisition time by detecting the location of the user's finger first, and then limiting the scan to only a partial area of the display screen centered around the user's finger. This approach also allows the size of the fingerprint image to be made as large as is needed to optimize the biometric performance. Larger fingerprint images provide better performance in terms of both security and reliability for the user.

With an optical fingerprint reading apparatus integrated under the touch screen of a mobile communication device, the display can also be used to provide directions, information and feedback to the user. This can be very advantageous in enhancing the user experience during acquisition of a fingerprint image for both enrollment and authentication. The user can be guided as to where to place his or her finger, how long to hold it in place, when and if the finger must be lifted, and placed again, when to place a different finger, etc. This can be especially useful during enrollment, when multiple finger placements will most likely be required, and fingerprint image quality is important. The user can be kept informed during the process.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electromagnetic signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of" "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. An optical reader apparatus configured to detect epidermal ridges of a body part using specular reflection contrast detection, the optical reader apparatus comprising:
   a display comprising a transparent cover and a first substrate comprising an array of active pixels, the active pixels serving as an illuminator of the optical reader apparatus;
   a pinhole array comprising a first pinhole mask with an array of first pinholes;
   an optical sensor optically coupled to the display via the pinhole array and comprising an array of photosensors disposed on a second substrate and in a non-overlapping arrangement with the first pinholes, the array of photosensors configured to detect light reflected via specular reflection by the transparent cover, and the array of photosensors, the array of active pixels, and the pinhole array are arranged in an offset relationship with respect to one another; and
   a processor coupled to the display and the optical sensor, the processor configured to control reading of signals from the photosensors and to control illumination of selected active pixels in accordance with a predefined scanning pattern that covers a sensing region of the transparent cover during a body part reading operation.

2. The apparatus of claim 1, wherein the processor is configured to control reading of signals from selected photosensors and illumination of selected active pixels in accordance with the predefined scanning pattern.

3. The apparatus of claim 1, wherein:
   light emitted by a selected $i^{th}$ active pixel illuminated by the processor is detected by an $(i+n)^{th}$ photosensor;
   the processor is configured to read a signal from the $(i+n)^{th}$ photosensor; and
   i represents a selected active pixel, n represents a number of photosensors spaced apart from the selected $i_{th}$ active pixel by a distance related to a thickness of the display defined between an exterior surface of the transparent cover and the array of active pixels.

4. The apparatus of claim 1, wherein the predefined scanning pattern defines an arrangement of illuminated active pixels having a constant shape that is shifted by the processor in a step-wise manner to cover the sensing region of the transparent cover.

5. The apparatus of claim 1, wherein the predefined scanning pattern defines an arrangement of illuminated active pixels having a shape that is changed and shifted by the processor in a step-wise manner to cover the sensing region of the transparent cover.

6. The apparatus of claim 1, wherein the predefined scanning pattern defines one or more rows of illuminated active pixels.

7. The apparatus of claim 1, wherein the predefined scanning pattern defines one or more decimated rows of illuminated active pixels.

8. The apparatus of claim 1, wherein the predefined scanning pattern defines:
   a polygonal pattern spanning a plurality of rows of illuminated active pixels; or
   a curvilinear pattern spanning a plurality of rows of illuminated active pixels.

9. The apparatus of claim 1, wherein:
   The first substrate comprising the array of active pixels comprises a transparent substrate; the pinhole array comprises the first pinhole mask affixed to a surface of the display adjacent the optical sensor, the first pinhole mask comprising the array of first pinholes offset from the array of photosensors and having a pitch corresponding to a pitch of the photosensors; and
   a dielectric material or fill gas is disposed within the first pinholes and between the first pinhole array and the second substrate supporting the photo sensors, the dielectric material or fill gas having a refractive index substantially equivalent to that of transparent material of the display.

10. The apparatus of claim 9, comprising a second pinhole mask disposed between the first pinhole mask and the array of photosensors, the second pinhole mask comprising an array of second pinholes offset from the first pinholes and the array of photosensors.

11. The apparatus of claim 1, wherein:
    the first substrate comprising the array of active pixels comprises an opaque substrate;
    the pinhole array comprises an array of pinholes through the opaque substrate and offset from the array of photosensors; and
    a dielectric material or fill gas is disposed within the pinholes and between the pinhole array and the second substrate supporting the photosensors, the dielectric material or fill gas having a refractive index substantially equivalent to that of transparent material of the display.

12. The apparatus of claim 1, wherein the optical sensor comprises a microlens structure disposed between the pinhole array and each photosensor.

13. The apparatus of claim 1, wherein the optical sensor comprises an opaque barrier disposed between adjacent photosensors, the opaque barriers configured to optically isolate each photosensor.

14. The apparatus of claim 1, wherein the sensing region defines a predetermined fixed region of the transparent cover.

15. The apparatus of claim 1, wherein:
the display comprises a touchscreen configured to sense a touch location of the transparent cover where the body part contacts the transparent cover; and
the sensing region defines a region of the transparent cover at or surrounding the touch location.

16. An optical reader apparatus configured to detect epidermal ridges of a body part using specular reflection contrast detection, the apparatus comprising:
a display comprising a transparent cover and a first substrate comprising an array of active pixels, the active pixels serving as an illuminator of the apparatus;
a pinhole array comprising a first pinhole mask with an array of first pinholes;
an optical sensor optically coupled to the display via the pinhole array and comprising an array of photosensors disposed on a second substrate, in a non-overlapping arrangement with the first pinholes, in an offset relationship with respect to the array of active pixels and to the pinhole array such that individual pixels of the array of active pixels, individual pinholes of the pinhole array, and individual photosensors of the array of photosensors are in an offset relationship within one another, the array of photosensors configured to detect light reflected via specular reflection by the transparent cover; and
a processor coupled to the display and the optical sensor, the processor configured to control illumination of selected active pixels and reading of signals from the photosensors in accordance with a predefined scanning pattern that covers a sensing region of the transparent cover during a body part reading operation.

17. The apparatus of claim 16, wherein the predefined scanning pattern defines an arrangement of illuminated active pixels having a shape that is shifted by the processor in a step-wise manner to cover the sensing region of the transparent cover.

18. The apparatus of claim 17, wherein the processor is configured to change a shape of the arrangement of illuminated active pixels during the body part reading operation.

19. The apparatus of claim 16, wherein the predefined scanning pattern defines a plurality of arrangements of illuminated active pixels each having a shape that is shifted by the processor in a step-wise manner to cover the sensing region of the transparent cover.

20. The apparatus of claim 19, wherein the processor is configured to shift each of the plurality of illuminated active pixel arrangements individually.

21. The apparatus of claim 19, wherein the processor is configured to shift at least some of the plurality of illuminated active pixel arrangements concurrently.

* * * * *